US012519226B1

(12) United States Patent
Krishnasamy Maniam

(10) Patent No.: US 12,519,226 B1
(45) Date of Patent: Jan. 6, 2026

(54) FREQUENCY MULTIPLYING USING VARIABLE INDUCTORS AND CAPACITORS

(71) Applicant: Amazon Technologies, Inc., Seattle, WA (US)

(72) Inventor: Nuntha Kumar Krishnasamy Maniam, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 367 days.

(21) Appl. No.: 18/142,465

(22) Filed: May 2, 2023

(51) Int. Cl.
*H04B 1/40* (2015.01)
*H01Q 3/28* (2006.01)
*H01Q 3/36* (2006.01)
*H03B 5/12* (2006.01)
*H03D 7/00* (2006.01)

(52) U.S. Cl.
CPC ............... *H01Q 3/36* (2013.01); *H01Q 3/28* (2013.01); *H03B 5/12* (2013.01); *H03D 7/00* (2013.01)

(58) Field of Classification Search
CPC ... H01Q 3/36; H01Q 3/28; H01Q 3/24; H03B 5/12; H03D 7/00; H04B 7/0617; H04B 1/04; H04B 1/16; H04B 1/40; H04M 1/02
See application file for complete search history.

(56) References Cited

U.S. PATENT DOCUMENTS

| | | | |
|---|---|---|---|
| 6,249,249 B1 * | 6/2001 | Obayashi | H01Q 3/42 |
| | | | 342/372 |
| 10,439,851 B2 * | 10/2019 | Novak | H01Q 3/42 |
| 11,444,669 B2 * | 9/2022 | Montalvo | H04B 7/0617 |
| 12,284,020 B2 * | 4/2025 | Paidimarri | H04B 7/0617 |
| 2006/0284783 A1 * | 12/2006 | Mohamadi | H01Q 21/065 |
| | | | 343/700 MS |
| 2007/0285307 A1 * | 12/2007 | Nishijima | G01S 13/325 |
| | | | 342/200 |
| 2016/0277049 A1 * | 9/2016 | Kang | H04B 1/0053 |
| 2018/0076869 A1 * | 3/2018 | Aue | H04B 7/022 |
| 2019/0268052 A1 * | 8/2019 | Ho | H04B 7/0617 |
| 2019/0393882 A1 * | 12/2019 | Bassi | H03K 3/0315 |
| 2020/0106657 A1 * | 4/2020 | Mrugalla | H04L 27/3863 |
| 2024/0106445 A1 * | 3/2024 | Singh | H04B 1/40 |
| 2025/0019395 A1 * | 1/2025 | Pepin | C07K 1/36 |

* cited by examiner

*Primary Examiner* — Andrew Wendell
(74) *Attorney, Agent, or Firm* — Kilpatrick Townsend & Stockton LLP

(57) ABSTRACT

Technologies directed to a frequency multiplier circuit of a customer terminal (CT) for doubling and tripling a frequency of a local oscillator are described. One communication device includes a local oscillator (LO) to generate a first differential signal having a first frequency and a frequency multiplier circuit to generate a second differential signal having a second frequency that is double the first frequency or a third differential signal having a third frequency that is triple the first frequency. The frequency multiplier circuit includes a variable capacitance circuit that is programmable to one of multiple capacitances and a variable inductance circuit that is programmed to a first inductance for the second differential signal and to a second inductance for the third differential signal.

20 Claims, 18 Drawing Sheets

FREQUENCY MULTIPLYING USING VARIABLE INDUCTORS AND CAPACITORS

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of digital media items. In order to communicate with other devices wirelessly, these electronic devices include one or more antennas.

Satellite-based broadband internet constellations are being developed to provide high-speed, low-latency broadband internet access to locations around the world using a network of low Earth orbit (LEO) satellites, ground stations, and user terminals (also called customer terminals (CTs).

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments but are for explanation and understanding only.

DETAILED DESCRIPTION

Figure 1:
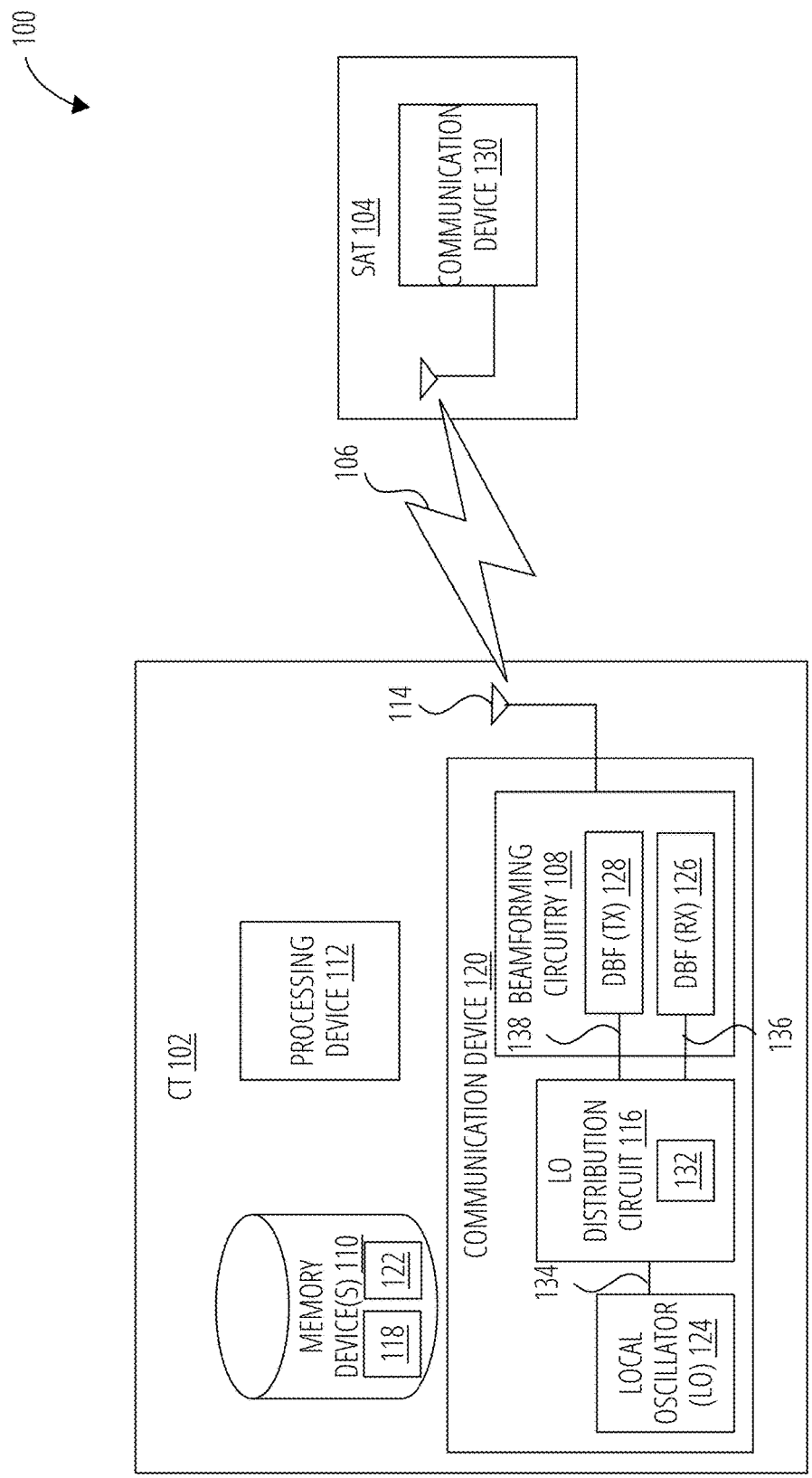
FIG. 1 is a block diagram of a portion of a satellite network including a customer terminal (CT) with a local oscillator (LO) distribution circuit for frequency doubling and tripling a LO frequency for communicating with a satellite (SAT) according to at least one embodiment.

Technologies directed to a frequency multiplier circuit of a customer terminal (CT) for doubling and tripling a frequency of a local oscillator are described. In particular, the frequency multiplier circuit can double a local oscillator frequency in a first mode and triple the local oscillator frequency in a second mode, while adjusting variable inductors and variable capacitors between the two modes. This allows a single integrated circuit to handle receiving radio frequency (RF) signals in the first mode and transmitting RF signals in the second mode at different frequency ranges. For example, a CT can operate in a first frequency range of approximately 17.6 GHz to 19.3 GHz for receiving RF signals and a second frequency range of approximately 28.5 GHz to 29.1 GHz for transmitting RF signals. A local oscillator (LO), such as a voltage-controlled oscillator (VCO), in this case, would have to operate from 17.6 GHz to 29.1 GHz. Running the VCO from 17.6 GHz to 29.1 GHz is not efficient. A frequency doubler can be used in a receive (RX) mode to have a resonant frequency in the range of 17.6 GHz to 19.3 GHz with the VCO running at 8.8 GHz to 9.65 GHz. A frequency tripler can be used in a transmit (TX) mode to have a resonant frequency in the range of 28.5 GHz to 29.1 GHz with the VCO running at 9.5 GHz to 9.7 GHz. The resonant frequency can be achieved with an inductor (L) and a capacitor (C). Traditionally, the capacitor (C) is varied since varying the inductor (L) is complex and can degrade an inductance quality factor. The inductance quality factor, also known as the Q factor or simply "Q," is a measure of the efficiency of an inductor. It describes the ratio of the energy stored in an inductor to the energy dissipated by it. Mathematically, the Q factor is defined as the ratio of the reactance of an inductor to its resistance (e.g., $Q=X\_L/R$, where $X\_L$ is the inductive reactance, and R is the resistance of the inductor. A high Q factor means an inductor can store energy efficiently without losing much of it to resistance. A low Q factor means that an inductor dissipates a significant amount of energy in the form of heat due to its resistance, making it less efficient. The Q factor is an important parameter in the design of RF circuits and filters. However, as done traditionally, varying just the capacitor is insufficient to achieve the range of 17.6 GHz to 29.1 GHz to cover the large frequency range of the TX and RX frequencies.

Aspects and embodiments of the present disclosure overcome these deficiencies and others by providing a variable inductance circuit in a frequency multiplier circuit for frequency doubling and tripling of a LO frequency where a variable inductor is achieved without degrading the inductance quality factor. Aspects and embodiments of the present disclosure can be used in a CT in a satellite network. A CT is a communication device that may include an array antenna, beamforming circuitry coupled to the array antenna, a processing device coupled to the beamforming circuitry, a LO, and a LO distribution circuit. The LO distribution circuit can include the frequency multiplier circuit with the variable inductance circuit and the variable capacitance circuit. One communication device includes a LO to generate a first differential signal having a first frequency and a frequency multiplier circuit to generate a second differential signal having a second frequency that is double the first frequency or a third differential signal having a third frequency that is triple the first frequency. The frequency multiplier circuit includes a variable capacitance circuit that is programmable to one of the multiple capacitances and a variable inductance circuit that is programmed to a first inductance for the second differential signal and to a second inductance for the third differential signal. In at least one embodiment, the LO distribution circuit is configured to switch between the first mode and the second mode in less than 10 microseconds. In at least one embodiment, the LO distribution circuit is configured to switch between the first mode and the second mode in approximately 1 microseconds.

FIG. 1 is a block diagram of a portion of a satellite network 100 including a customer terminal (CT) 102 with a LO distribution circuit 116 for frequency doubling and tripling a LO frequency for communicating with a satellite (SAT) 104 according to at least one embodiment. The satellite network 100 can include multiple devices, each having a communication device, such as communication device 120 in CT 102 and communication device 130 in SAT 104. The CT 102 can be the UT 1408 described below with respect to FIG. 14. The SAT 104 can be any one of the SAT 1402a, 1402b, . . . , etc., of FIG. 14. The SAT 104 can be in an artificial satellite and may include one or more satellite communication elements (e.g., discussed further in FIG. 14 to FIG. 17).

In at least one embodiment, the CT 102 includes a processing device 112, one or more memory device(s) 110, and a communication device 120 that implements a LO 124, a LO distribution circuit 116, and beamforming circuitry 108. The LO 124 can be a voltage-controlled oscillator (VCO). A VCO is an electronic oscillator that generates a signal whose frequency can be adjusted by changing the voltage applied to its input. The VCO is a type of oscillator that produces an output signal whose frequency is proportional to the voltage applied to its input. The VCO can be designed to operate at a specific frequency range, and the frequency range can be adjusted by changing the circuit parameters, such as the values of the inductors and capacitors in the resonant circuit. The VCO is commonly used in communication systems, such as wireless and cellular networks, where a tunable frequency source is required to generate different carrier frequencies for transmitting and receiving data. The LO 124 can be other types of signal sources, such as crystal oscillators, Colpitts oscillators, phased-locked loops (PLLs), or the like. The LO distribution circuit 116 can be used to distribute a local oscillator signal to other components of the CT 102. The LO distribution circuit 116 can also frequency multiply the local oscillator signal, such as frequency doubling or tripling the local oscillator frequency of the local oscillator signal.

In at least one embodiment, the LO distribution circuit 116 can include a frequency multiplier circuit 132 that can double or triple a LO frequency. The frequency multiplier circuit 132 can include a variable capacitance circuit and a variable inductance circuit, as described in more detail below with respect to FIG. 2. The processing device 112 can be or include one or more CPUs, microcontrollers, field programmable gate arrays, or other types of processors. The beamforming circuitry 108 can be coupled to one or more antennas 114, such as a phased array antenna, to communicate with other devices. The CT 102 can include other circuitry for communicating wirelessly. For example, the CT 102 can include one or more RF chains. The RF chains can have low-noise amplifiers (LNAs), automatic gain controllers (AGCs), analog-to-digital converters (ADCs), digital beamforming (DBF) devices, etc., to transmit signals and/or process received signals (e.g., directs analog and digital beamforming components, converts the signal to a digital representation, and processing the digital information) to produce digital samples of the received signal. In some embodiments, a single antenna with multiple apertures may be used instead of two or more antennas. The RF chain(s) can be configured to directly receive beams to receive signals at various beamforming angles. Receive beams may be directed using a weighting pattern across beamforming elements and an antenna array. The weighting pattern may result in a sensitivity pattern due to signal interference. An antenna gain pattern may include a weighting pattern (or distribution of signal processing weights) that may include a combination of beamforming values, such as phase shifting values, signal amplifier values, etc., that are configured to steer a signal (e.g., main lobe, side lobes, signal minimum points, etc.) to orient at different directions. An antenna gain pattern may include a main lobe, side lobes, and signal minimums spread across various directions relative to a bearing angle of an antenna array. In some embodiment, a bearing angle is defined as a direction normal to a plane of an antenna array (or, more generally, a portion and an array antenna). Further details regarding beamforming and beam steering are discussed in FIG. 17.

In at least one embodiment, the beamforming circuitry 108 can include a first set of digital beamforming devices 126 for receiving RF signals (labeled as DBF (RX)) and a second set of digital beamforming devices 128 for transmitting RF signals (labeled as DBF (TX)).

In at least one embodiment, the LO 124 can generate a first differential signal 134 at a first frequency and provide it to the LO distribution circuit 116 coupled to the LO 124. The LO distribution circuit 116 can include the frequency multiplier circuit 132 with the variable inductance circuit and the variable capacitance circuit. The variable capacitance circuit can be configured or programmed to have a first capacitance in a first mode (e.g., an RX mode) of the CT 102 and a second capacitance in a second mode (e.g., a TX mode) of the CT 102. The variable inductance circuit can be configured or programmed to have a first inductance in the first mode and a second inductance in the second mode. In the first mode, the LO distribution circuit 116 can generate a second differential signal 136 having a second frequency that is twice the first frequency. In the second mode, the LO distribution circuit 116 can generate a third differential signal 138 having a third frequency that is three times the first frequency. The first set of digital beamforming devices 126 can receive the second differential signal 136 having a second frequency that is twice the first frequency. The second set of digital beamforming devices 128 can receive the third differential signal 138 having a third frequency that is triple the first frequency. Although illustrated as separate lines, the second differential signal 136 and the third differential signal 138 can be sent on a same transmission line between the LO distribution circuit 116 and the first set of digital beamforming devices 126 and the second set of digital beamforming devices 128.

In at least one embodiment, the first set of DBFs (RX) 126 can include a first DBF with a first mixer. The first mixer can multiply a first RF signal, received via the array antenna 114, with the second differential signal 136 to obtain a first baseband signal for processing by the processing device 112. The second set of DBFs (TX) 128 can include a second DBF with a second mixer. The second mixer can multiply a second baseband signal with the third differential signal 138 to obtain a second RF signal for transmitting via the array antenna 114.

As described herein, the CT 102 can establish a communication link 106 with the SAT 104 using position and velocity information of the CT 102 and position and velocity information of the SAT 104. The beamforming circuitry 108 can be used to communicate data over the communication link 106 using RF signals. Furthermore, the CT 102 can perform an update of its positions and velocity such that beamforming operations and handovers are also enabled.

In at least one embodiment, the LO distribution circuit 116 can be programmed or configured using variable capacitance information 118 and variable inductance information 122 stored in memory device(s) 110. In other embodiments, the variable capacitance information 118 and variable inductance information 122 can be stored in registers of, or accessible by, the communication device 120. The memory device(s) 110 can store other information, such as position information about the SAT 104, velocity information about the CT 102, velocity information about the SAT 104, timing information received from a Global navigation satellite system (GNSS), timing information received from the SAT 104, timing information generated by the LO distribution circuit 116, or any combination thereof. The one or more memory device(s) 110 may include any combination of volatile and/or non-volatile storage mechanisms. The one or more memory device(s) 110 can store information that provides operating system components, various program modules, program data, and/or other components. In one embodiment, the memory device(s) 110 stores instructions of methods to control the operation of the CT 102 as described herein.

Although devices of the satellite network 100 are illustrated as having several separate functional elements, one or more of the functional elements may be combined and implemented by combinations of software-configured elements, such as processing elements including digital signal processors (DSPs), and/or other hardware elements. For example, some elements may comprise one or more microprocessors, DSPs, application-specific integrated circuits (ASICs), radio-frequency integrated circuits (RFICs), and combinations of various hardware and logic circuitry for performing at least the functions described herein. In some embodiments, the functional elements of a device may refer to one or more processes operating on one or more processing elements.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system may include one or more processors and may be configured with instructions stored on a computer-readable storage device.

Additional details of the communication device 120 are described below with respect to FIG. 2.

Figure 2:
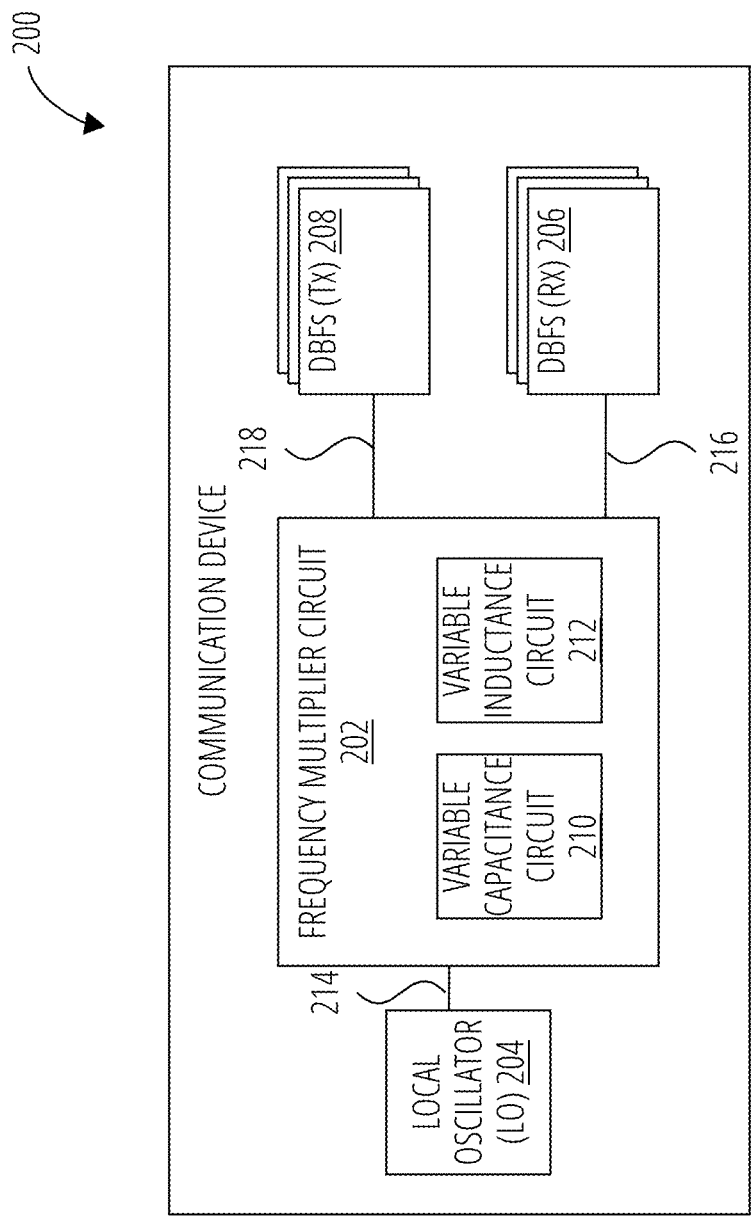
FIG. 2 is a block diagram of a communication device with a frequency multiplier circuit with a variable capacitance circuit and a variable inductance circuit according to at least one embodiment.

FIG. 2 is a block diagram of a communication device 200 with a frequency multiplier circuit 202 with a variable capacitance circuit 210 and a variable inductance circuit 212 according to at least one embodiment. The communication device 200 includes a LO 204, the frequency multiplier circuit 202, a first set of DBFs (RX) 206, and a second set of DBFs (TX) 208. The LO 204 is similar to the LO 124 described above and can generate a LO signal 214. The LO signal 214 can be similar to the first differential signal 134 described above. The LO signal 214 can have a first frequency. The frequency multiplier circuit 202 can receive the LO signal 214 and generate a doubled LO signal 216 and a tripled LO signal 218. The doubled LO signal 216 can be similar to the second differential signal 136, and the tripled LO signal 218 can be similar to the third differential signal 138, described above. The doubled LO signal 216 can have a second frequency that is double the first frequency. The tripled LO signal 218 can have a third frequency that is tripled the first frequency. The variable capacitance circuit 210 and variable inductance circuit 212 can be used to tune a resonant frequency. The resonant frequency can be expressed in the following equation (1):

$$\text{Resonant Frequency} = \frac{1}{2\pi\sqrt{LC}}, \tag{1}$$

where L is the inductance, and C is the capacitance.

As described herein, the frequency multiplier circuit 202 can use the variable capacitance circuit 210 and variable inductance circuit 212 to vary the capacitance (C) and the inductance (L). The variable capacitance circuit 210 can be tuned to one of the multiple capacitance values. When generating the doubled LO signal 216, the variable capacitance circuit 210 can be programmed or configured to have a first capacitance. When generating the tripled LO signal 218, the variable capacitance circuit 210 can be programmed or configured to have a second capacitance. In another embodiment, the first capacitance can be fixed for the first mode, and the second capacitance can be tuned or varied during the second mode. The variable inductance circuit 212 can be tuned to one of the multiple inductance values. When generating the doubled LO signal 216, the variable inductance circuit 212 can be programmed or configured to have a first inductance. When generating the tripled LO signal 218, the variable inductance circuit 212 can be programmed or configured to have a second inductance. In at least one embodiment, the first and second inductances are fixed inductances, and the capacitance can be varied by the variable capacitance circuit 210 in the second mode to fine-tune the frequency multiplier circuit 202.

In at least one embodiment, the variable capacitance circuit 210 includes multiple capacitive elements (e.g., a number of discrete capacitors, a number of transistors with a capacitance value, or the like), and each capacitive element is coupled in series with a switch. The capacitance can be varied by adding a switch in series with the capacitive element. An example of the variable capacitance circuit 210 is illustrated and described below with respect to FIG. 3A. In at least one embodiment, the variable inductance circuit 212 includes a first inductor (L1) and a second inductor (L2). An example of the variable inductance circuit 212 is illustrated and described below with respect to FIG. 3B.

Figure 3B:
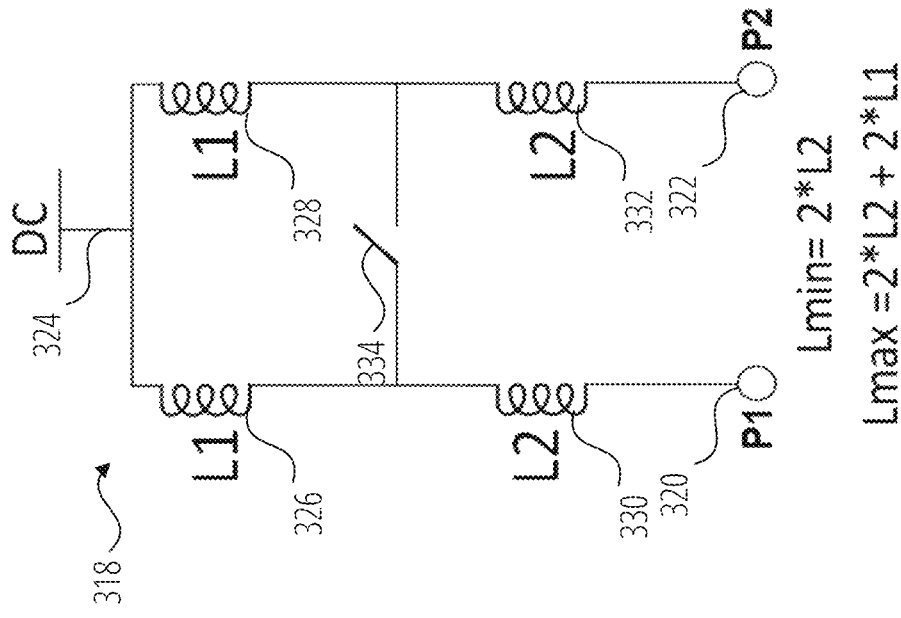
FIG. 3B is a circuit diagram of a variable inductance circuit according to at least one embodiment.
Figure 3A:
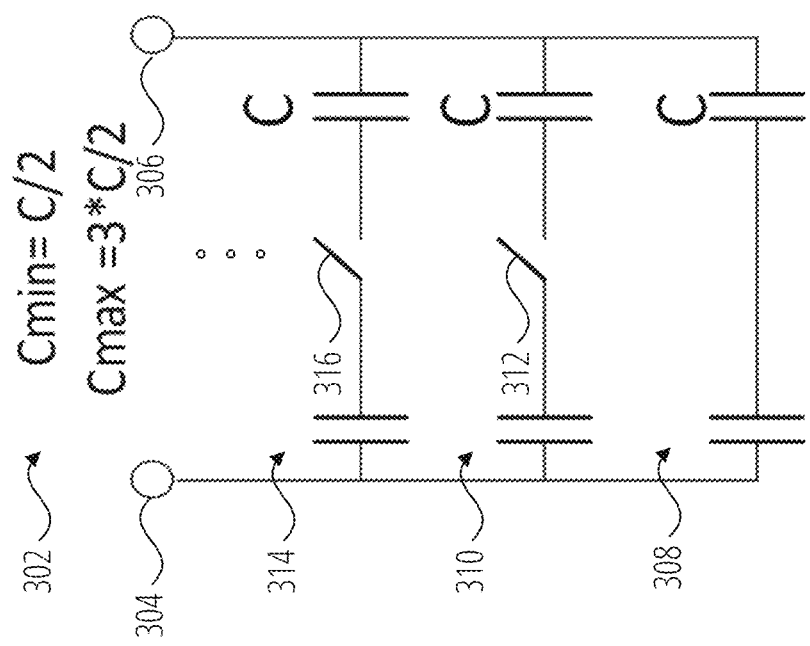
FIG. 3A is a circuit diagram of a variable capacitance circuit according to at least one embodiment.

FIG. 3A is a circuit diagram of a variable capacitance circuit 302 according to at least one embodiment. The variable capacitance circuit 302 can include a first set of capacitive elements 308, coupled between a first terminal 304 and a second terminal 306. The capacitance value of the first set of capacitive elements 308 can represent a minimum capacitance (e.g., Cmin=C/2). The capacitance (C) can be varied by adding a switch in series with additional capacitive elements. The variable capacitance circuit 302 also includes N number of additional capacitive elements and N number of corresponding switches to adjust the capacitance (C), where N is a positive integer. As illustrated in FIG. 3A, the variable capacitance circuit 302 includes a second set of capacitive elements 310 and a switch 312 coupled between the first terminal 304 and the second terminal 306. The variable capacitance circuit 302 includes a third set of capacitive elements 314 and a switch 316 coupled between the first terminal 304 and the second terminal 306. When the switch 312 and switch 316 are closed, the variable capacitance circuit 302 can have a maximum capacitance of three times the minimum capacitance (e.g., Cmax=3*C/2). The capacitance (C) can be varied by activating one or more of the switches 312, 316, which are in series with the capacitive elements 310, 314, respectively. This is possible since there is only a small magnetic coupling or no magnetic coupling between the capacitive elements. As described above, the doubled LO signal 216 and tripled LO signal 218 are differential signals, the first terminal 304 and second terminal 306 can be coupled across the differential pair of conductors carrying the respective differential signal (e.g., second differential signal or third differential signal).

FIG. 3B is a circuit diagram of a variable inductance circuit 318 according to at least one embodiment. As described above, the variable inductance circuit 318 includes a first inductor (L1) and a second inductor (L2). The first inductor (L1) can include a first inductive element 326 and a second inductive element 328 coupled in parallel between a direct current (DC) terminal 324 and a first terminal 320, and a second terminal 322. A switch 334 is coupled between the first inductive element 326 and the second inductive element 328. The switch 334 is activated in the second mode and shorts the first inductive element 326 and the second inductive element 328. The second inductor (L2) can include a third inductive element 330 coupled in series with the first inductive element 326 and a fourth inductive element 332 coupled in series with the second inductive element 328.

In at least one embodiment, when the switch 334 is switched off, the total inductance of the variable inductance circuit 318 is expressed in the following equation (2):

$$L_{max}=2*L1+2*L2 \qquad (2)$$

When the switch 334 is switched on, the total inductance of the variable inductance circuit 318 is expressed in the following equation (3):

$$L_{min}=2*L2 \qquad (3),$$

where L1 is shorted by the switch 334 and only acts as a DC path.

It is not trivial to prevent magnetic coupling between L2 and L1. However, it is possible there is no magnetic coupling between L2 and L1 using certain layout structures as described below with respect to FIG. 9 to FIG. 12.

Figure 4:
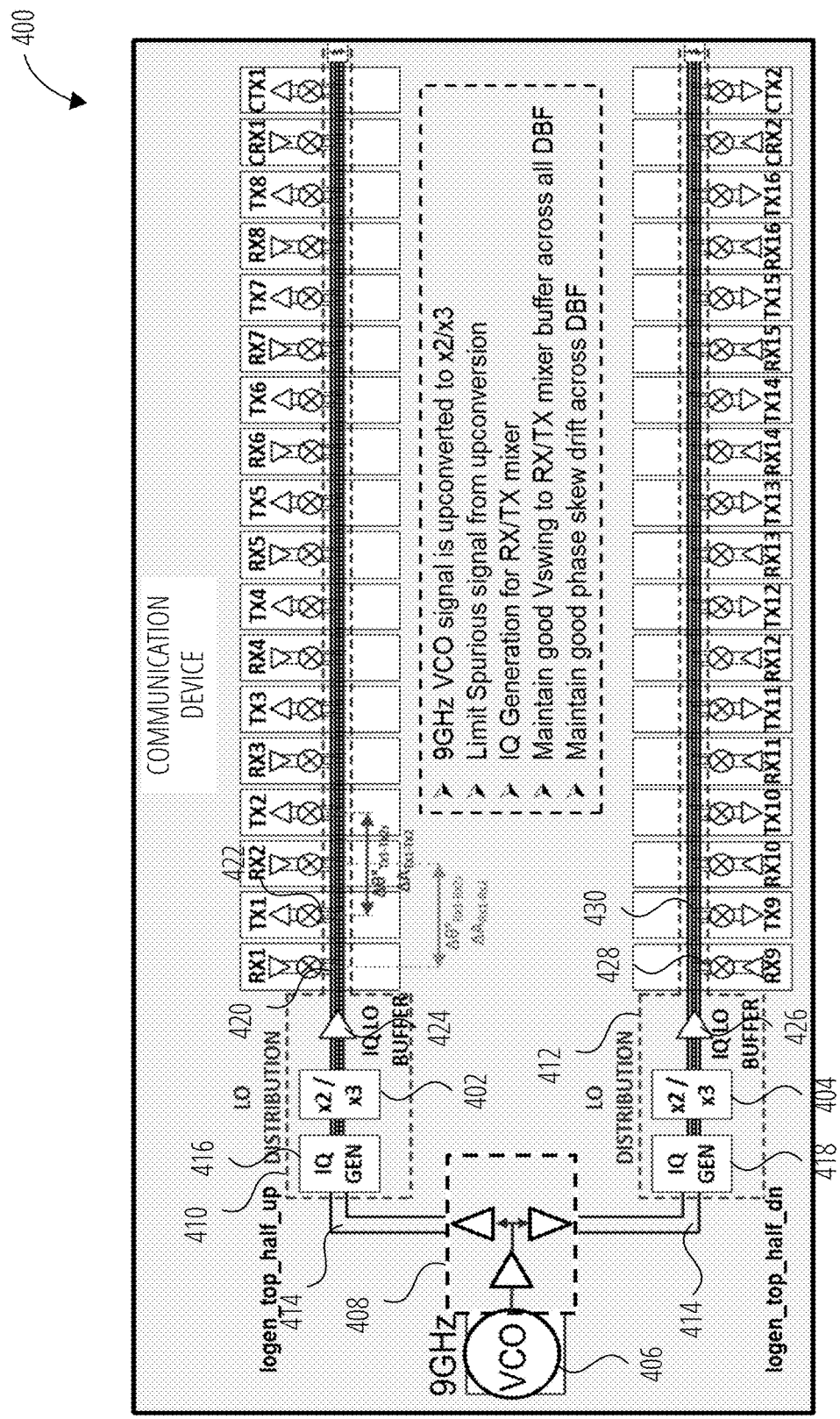
FIG. 4 is a block diagram of a communication device with two frequency multiplier circuits, each having a variable capacitance circuit and a variable inductance circuit according to at least one embodiment.

FIG. 4 is a block diagram of a communication device 400 with two frequency multiplier circuits 402, 404, each having a variable capacitance circuit and a variable inductance circuit according to at least one embodiment. The communication device 400 also includes a VCO 406 that generates a first differential signal 414 having a first frequency (e.g., approximately 9 GHZ). A buffer circuit 408 can be used to buffer the first differential signal 414 for two LO distribution circuits 410, 412.

In at least one embodiment, the LO distribution circuit 410 includes a signal generator 416 coupled to receive the first differential signal 414 from the buffer circuit 408. The signal generator 416 is configured to generate eight phase signals using the first differential signal 414. The signal generator 416 can include a quadrature signal generator that generates four quadrature phase signals. The four quadrature phase signals can be used to generate the eight phase signals used by the frequency multiplier circuit 402. The frequency multiplier LO distribution circuit 410 uses the eight phase signals to generate a second differential signal, having a second frequency that is double the first frequency, a third differential signal, having a third frequency that is triple the first frequency, or both. In at least one embodiment, the LO distribution circuit 410 can be coupled to a first set of one or more DBF devices configured to use the second differential signal 420 to receive one or more RF signals in a first frequency range (e.g., approximately 17.6 GHz to 19.3 GHZ). The LO distribution circuit 410 can be coupled to a second set of one or more DBF devices configured to use the third differential signal 422 to send one or more RF signals in a second frequency range (e.g., approximately 28.5 GHz to 29.1 GHz) that is higher than the first frequency range. In at least one embodiment, the LO distribution circuit 410 includes a buffer circuit 424 to drive the second differential signal 420 or the third differential signal 422 for the first set and the second set of DBF devices. The LO distribution circuit 410, using the frequency multiplier circuit 402, can up-convert the first frequency, i.e., a frequency of the VCO signal, by 2X or 3X. The frequency multiplier circuit 402 can include a variable capacitance circuit that is programmable to one of the multiple capacitances and a variable inductance circuit that is programmed to a first inductance for the second differential signal 420 at the second frequency and to a second inductance for the third differential signal 422 at the third frequency, as described above. The LO distribution circuit 410 can limit spurious signals from up-conversion. The LO distribution circuit 410 can provide in-phase (I) signals and quadrature (Q) signals to the first set and second set of DBF devices. The IQ generation by the LO distribution circuit 410 can be provided for RX mixers of the first set of DBF devices and TX mixers of the second set of DBF devices. The LO distribution circuit 410, using the buffer circuit 424, can maintain a good voltage swing (Vswing) to the RX/TX mixers across all DBF devices. The LO distribution circuit 410 can maintain a good phase skew drift across the DBF devices.

In at least one embodiment, the LO distribution circuit 412 includes a signal generator 418 coupled to receive the first differential signal 414 from the buffer circuit 408. The signal generator 418 is configured to generate eight phase signals using the first differential signal 414. The signal generator 418 can include a quadrature signal generator that generates four quadrature phase signals. The four quadrature phase signals can be used to generate the eight phase signals used by the frequency multiplier circuit 404. The frequency multiplier circuit 404 is configured to generate a fourth differential signal 428 at the second frequency or a fifth differential signal 430 at the third frequency. In at least one embodiment, the LO distribution circuit 412 can be coupled to a third set of one or more DBF devices configured to use the fourth differential signal 428 to receive the one or more RF signals in the first frequency range (e.g., 17.6 GHz to 19.3 GHZ). The LO distribution circuit 410 can be coupled to a fourth set of one or more DBF devices configured to use the fifth differential signal 430 to send the one or more RF signals in the second frequency range (e.g., 28.5 GHz to 29.1 GHZ) that is higher than the first frequency range. In at least one embodiment, the LO distribution circuit 412 includes a buffer circuit 426 to drive the fourth differential signal 428 or the fifth differential signal 430 for the third set and the fourth set of DBF devices. The LO distribution circuit 412, using the frequency multiplier circuit 404, can up-convert the first frequency, i.e., a frequency of the VCO signal, by 2X or 3X. The frequency multiplier circuit 404 can include a second variable capacitance circuit that is programmable to the one of the multiple capacitances and a second variable inductance circuit that is programmed to the first inductance for the fourth differential signal 428 at the second frequency and to the second inductance for the fifth differential signal 430 at the third frequency. The LO distribution circuit 412 can limit spurious signals from up-conversion. The LO distribution circuit 412 can provide IQ signals to the third and fourth sets of DBF devices. The IQ generation by the LO distribution circuit 412 can be provided for RX mixers of the third set of DBF devices and TX mixers of the fourth set of DBF devices. The LO distribution circuit 412, using the buffer circuit 426, can maintain a good voltage swing (Vswing) to the RX/TX mixers across all DBF devices. The LO distribution circuit 412 can maintain a good phase skew drift across the DBF devices.

As described above, the LO distribution circuit 410 and LO distribution circuit 412 can provide IQ signals to the DBF devices. The I signals can be provided on an I path, and the Q signals can be provided on a Q path, as described in more detail below with respect to FIG. 5 and FIG. 7.

Figure 5:
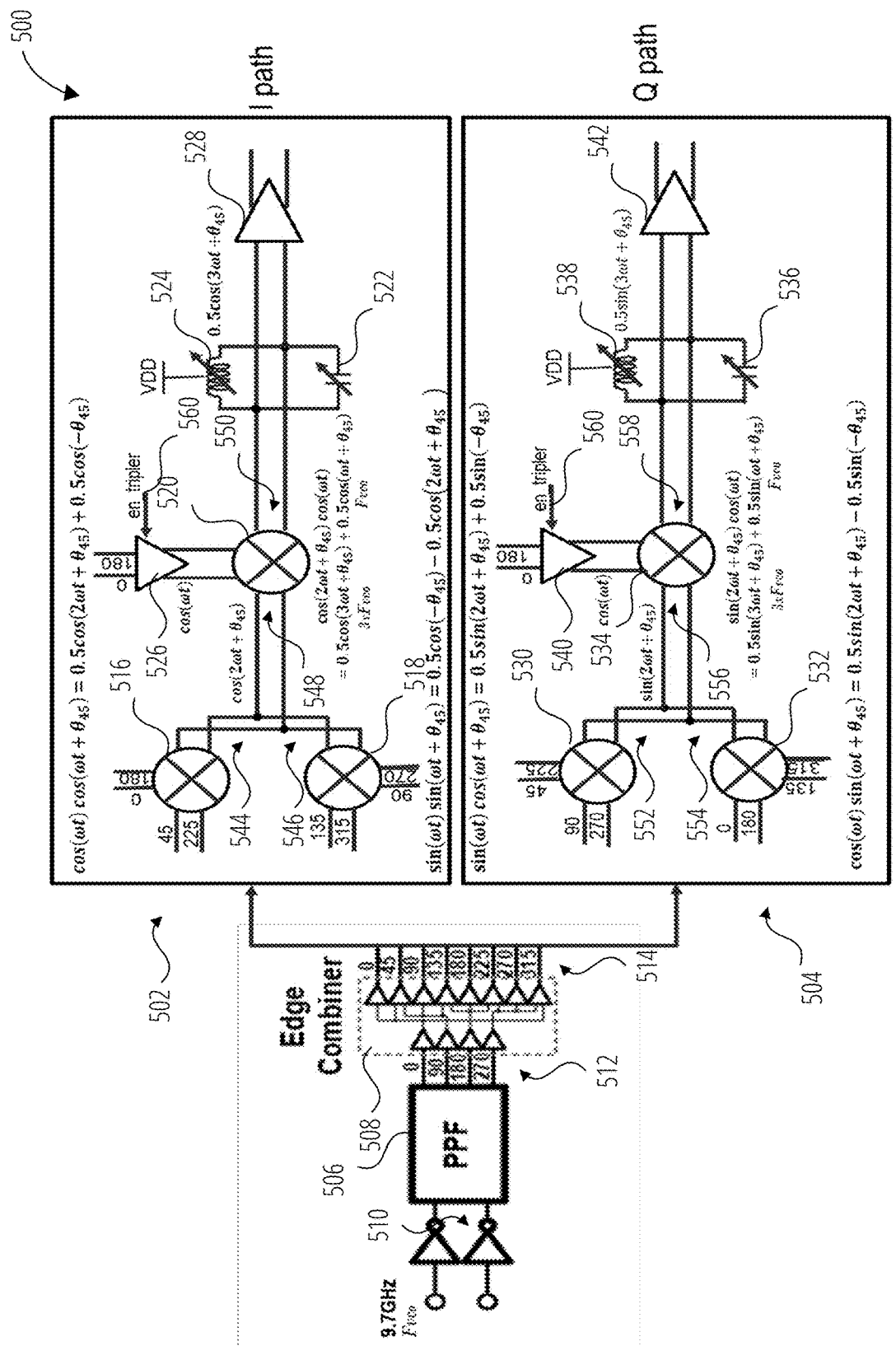
FIG. 5 is a block diagram of a LO distribution circuit with an in-phase path (I path) and a quadrature path (Q path) in a second mode according to at least one embodiment.

FIG. 5 is a block diagram of a LO distribution circuit 500 with an in-phase path 502 (I path) 502 and a quadrature path 504 (Q path) in a second mode according to at least one embodiment. The LO distribution circuit 500 can be the LO distribution circuit 410 or the LO distribution circuit 412 operating in a second mode where the first frequency is tripled to the third frequency. The second mode can be a TX mode. The LO distribution circuit 500 can generate a differential signal for the I path 502 and a differential signal for the Q path 504, as described in more detail below.

In this embodiment, the LO distribution circuit 500 includes a polyphase filter (PPF) 506 that can receive a first differential signal 510 from a buffer circuit or a LO directly. The PPF 506 can be an analog filter (or a digital filter) that operates on multiple phases or channels of a signal simultaneously. It is typically used in applications where multiple signal channels or frequencies need to be filtered or separated from each other. In the PPF 506, an input signal, the first differential signal 510, is divided into multiple phases, each of which is filtered separately using a set of filters. The outputs of these filters provide filtered output signals at different phases. The PPF 506 generates quadrature signals 512 (e.g., 0, 90, 180, and 270 phases). In at least one embodiment, the PPF 506 is a quadrature signal generator that generates the quadrature signals 512. The PPF 506 can be implemented using a variety of digital signal processing techniques, such as finite impulse response (FIR) filters, infinite impulse response (IIR) filters, and discrete Fourier transform (DFT) filters. An edge combiner 508 is coupled to receive the quadrature signals 512 from the PPF 506. The edge combiner 508 generates eight phase signals 514 using the quadrature signals 512. The I path 502 and the Q path 504 are coupled to the edge combiner 508 and beamforming circuitry (e.g., one or more DBF devices).

Figure 7:
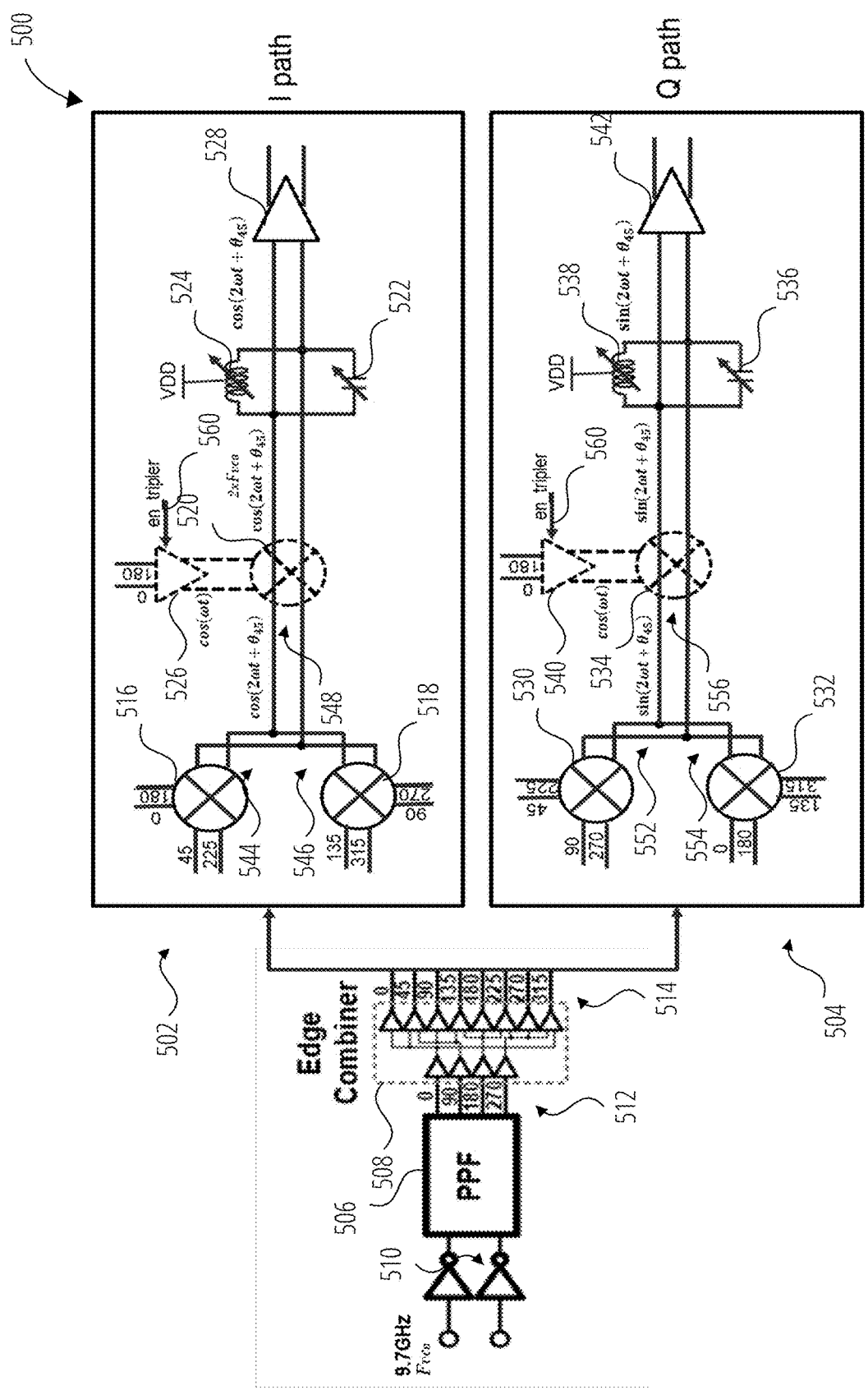
FIG. 7 is a block diagram of the LO distribution circuit with the I path and the Q path in a first mode according to at least one embodiment.

In the illustrated embodiment, the I path 502 includes a first mixer 516 that multiplies a first pair of signals of the eight phase signals by a second pair of signals of the eight phase signals to generate a second differential signal 544. The I path 502 includes a second mixer 518 that multiplies a third pair of signals of the eight phase signals by a fourth pair of signals of the eight phase signals, respectively, to generate a third differential signal 546. A sum of the second differential signal 544 and the third differential signal 546 is a fourth differential signal 548 at a second frequency that is twice the first frequency. The I path 502 includes a third mixer 520 that selectively multiplies the fourth differential signal 548 by the second pair of phase signals to generate a fifth differential signal 550 at a third frequency that is three times the first frequency. In at least one embodiment, a buffer circuit 526 receives the second pair of phase signals and, when enabled by an enable signal 560, provides the second pair of phase signals to the third mixer 520. A variable inductor 524 is configured to have a first inductance in a first mode and a second inductance in a second mode. A variable capacitor 522 is configured to have a first capacitance in the first mode and a second capacitance in the second mode. In the second mode (as illustrated in FIG. 5), the I path 502 provides the fifth differential signal 550 to the beamforming circuitry. In the first mode (as illustrated in FIG. 7), the I path 502 provides the fourth differential signal 548 to the beamforming circuitry. In at least one embodiment, a buffer circuit 528 can be used to drive the fifth differential signal 550 to the beamforming circuitry.

In the illustrated embodiment, the Q path 504 includes a fourth mixer 530 that multiplies the fourth pair of phase signals by the first pair of phase signals to generate a sixth differential signal 552. The Q path 504 includes a fifth mixer 532 configured to generate a seventh differential signal 554 by multiplying the first pair of phase signals by the third pair of phase signals. A sum of the sixth differential signal 552 and the seventh differential signal 554 is an eighth differential signal 556 that has the second frequency. The Q path 504 includes a sixth mixer 534 configured to selectively multiply the eighth differential signal 556 by the second pair of phase signals to generate a ninth differential signal 558 with the third frequency. In at least one embodiment, a buffer circuit 540 receives the second pair of phase signals and, when enabled by an enable signal 560, provides the second pair of phase signals to the sixth mixer 534. A variable capacitor 536 is configured to have a third capacitance (or the first capacitance) in a first mode and a fourth capacitance (or second capacitance) in a second mode. A variable inductor 538 is configured to have a third inductance (or first inductance) in the first mode and a fourth inductance (or second inductance) in the second mode. In at least one embodiment, a buffer circuit 542 can be used to drive the fifth ninth differential signal 558 to the beamforming circuitry.

In at least one embodiment, the edge combiner 508 receives four phase signals (e.g., phases 0, 90, 180, and 270) of the first differential signal 510 and generates a first phase signal (e.g., 0), a second phase signal (e.g., 45), a third phase signal (e.g., 90), a fourth phase signal (e.g., 135), a fifth phase signal (e.g., 180), a sixth phase signal (e.g., 225), a seventh phase signal (e.g., 270), and an eighth phase signal (e.g., 315). In at least one embodiment, the first mixer 516 is configured to multiply the second phase signal (e.g., 45) and the sixth phase signal (e.g., 225) by the first phase signal (e.g., 0) and the fifth phase signal (e.g., 180) to generate the fourth second differential signal 544. In at least one embodiment, the second mixer 518 is configured to multiply the fourth phase signal (e.g., 135) and the eighth phase signal (e.g., 315) by the third phase signal (e.g., 90) and the seventh phase signal (e.g., 270) to generate the fifth differential signal 546. In at least one embodiment, the fourth mixer 530 is configured to multiply the third phase signal (e.g., 90) and the seventh phase signal (e.g., 270) by the second phase signal (e.g., 45) and the sixth phase signal (e.g., 225) to generate the seventh differential signal 552. In at least one embodiment, the fifth mixer 532 is configured to multiply the first phase signal (e.g., 0) and the fifth phase signal (e.g., 180) by the fourth phase signal (e.g., 135) and the eighth phase signal (e.g., 315) to generate the eighth differential signal 554. In at least one embodiment, the third mixer 520 is configured to multiply the fourth differential signal 548 by the first phase signal (e.g., 0) and the fifth phase signal (e.g., 180) to generate the fifth differential signal 550. In at least one embodiment, the sixth mixer 534 is configured to multiply the eighth differential signal 556 by the first phase signal (e.g., 0) and the fifth phase signal (e.g., 180) to generate the ninth differential signal 558.

Figure 6:
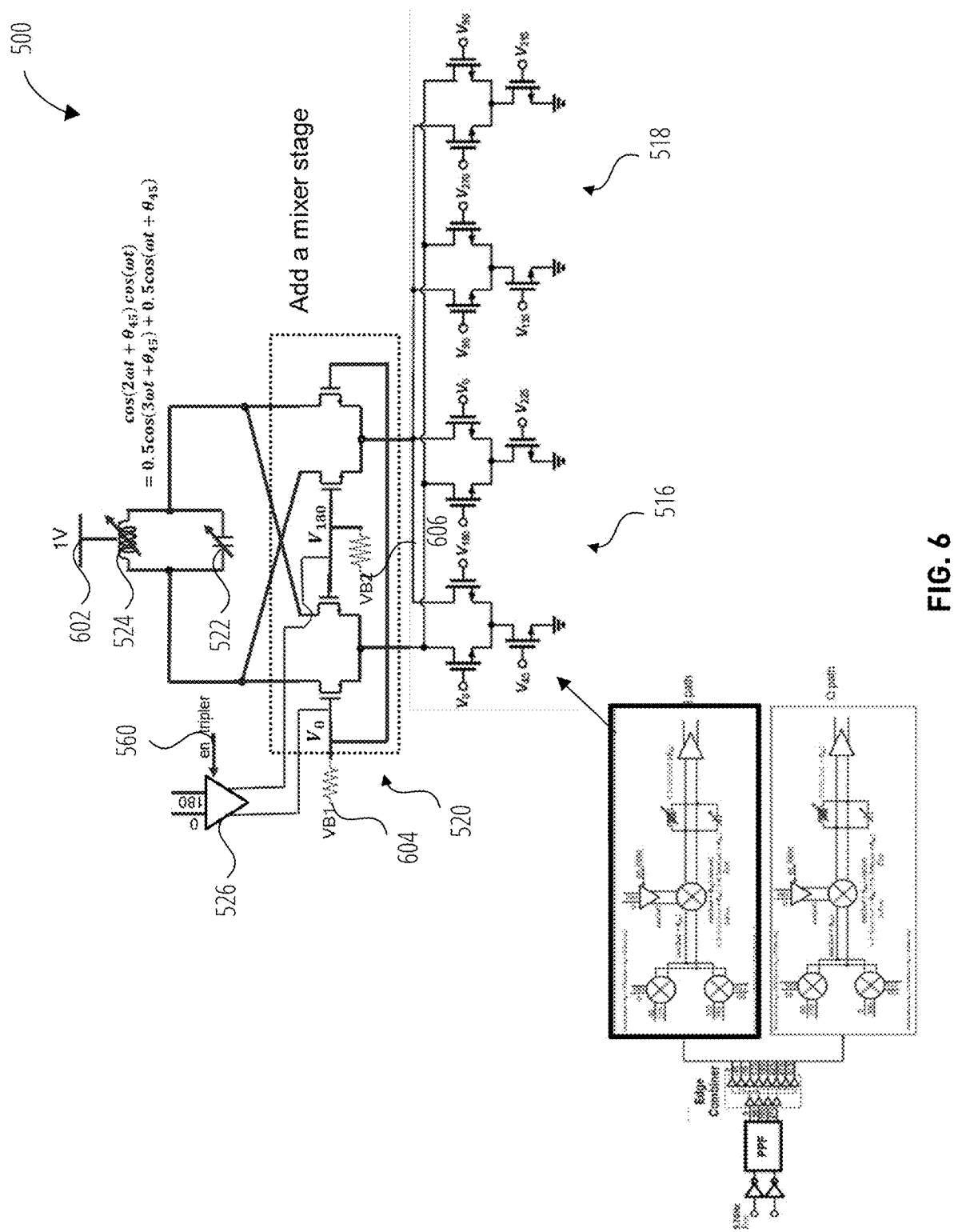
FIG. 6 is a schematic diagram of the LO distribution circuit in the second mode according to at least one embodiment.

FIG. 6 is a schematic diagram of the LO distribution circuit 500 in the second mode (tripler mode) according to at least one embodiment. The LO distribution circuit 500 in FIG. 6 shows the transistors of the first mixer 516, the second mixer 518, and the third mixer 520, the variable capacitor 522, the variable inductor 524, and the buffer circuit 526. The variable inductor 524 is coupled to a DC terminal 602. The gates of the transistors of the third mixer 520 can be coupled to a first bias voltage 604 and a second bias voltage 606, respectively. In at least one embodiment, the first bias voltage 604 and the second bias voltage 606 are equal. (e.g., Tripler→VB1=VB2=BIAS). In at least one embodiment of the frequency tripler, the mixer stage (e.g., third mixer 520) is added on top of the mixer stage of the frequency doubler. In at least one embodiment, 1/3*LO is rejected by the variable inductor 524 and variable capacitor 522 (also referred to as an output tank), and the proceeding stages act like a mixer and polyphase amplifier (PPA). Although FIG. 6 illustrates the circuitry of the I path 502, similar circuitry can be used for the Q path 504.

FIG. 7 is a block diagram of the LO distribution circuit 500 with the I path 502 and the Q path 504 in a first mode according to at least one embodiment. The LO distribution circuit 500 can be the LO distribution circuit 410 or the LO distribution circuit 412 operating in a first mode where the first frequency is doubled to the second frequency. The first mode can be an RX mode. The LO distribution circuit 500 can generate a differential signal for the I path 502 and a differential signal for the Q path 504, as described in more detail below.

In at least one embodiment, the buffer circuit 526 receives the second pair of phase signals, and when disabled by the enable signal 560 (enable signal being disabled or a disable signal being received, does not provide the second pair of phase signals to the third mixer 520 and the third mixer 520 is disabled. As such, the I path 502 provides the fourth differential signal 548 (doubled frequency) to the beamforming circuitry. The variable inductor 524 is configured to have a first inductance in a first mode and a second inductance in a second mode. A variable capacitor 522 is configured to have a first capacitance in the first mode and a second capacitance in the second mode. Similarly, the buffer circuit 540 receives the second pair of phase signals, and when disabled by the enable signal 560, does not provide the second pair of phase signals to the sixth mixer 534, and the sixth mixer 534 is disabled. As such, the Q path 504 provides the eighth differential signal 556 (doubled frequency) to the beamforming circuitry. The variable inductor 538 is configured to have a third inductance (or first inductance) in a first mode and a fourth inductance (or second inductance) in a second mode (as illustrated in FIG. 5). A variable capacitor 536 is configured to have a third capacitance (or first capacitance) in the first mode and a fourth capacitance (or second capacitance) in the second mode (as illustrated in FIG. 5).

In the first mode (as illustrated in FIG. 7), the I path 502 provides the fourth differential signal 548 to the beamforming circuitry using the buffer circuit 528 and the eighth differential signal 556 to the beamforming circuitry using the buffer circuit 542.

In the first mode, the LO distribution circuit 500 is converted from a tripler mode to a doubler mode by powering down the buffer circuit 526 (e.g., cos(ωt) buffer). The LO distribution circuit 500 bypasses the last mixer stage and uses the same transmission line as the tripler mode.

Figure 8:
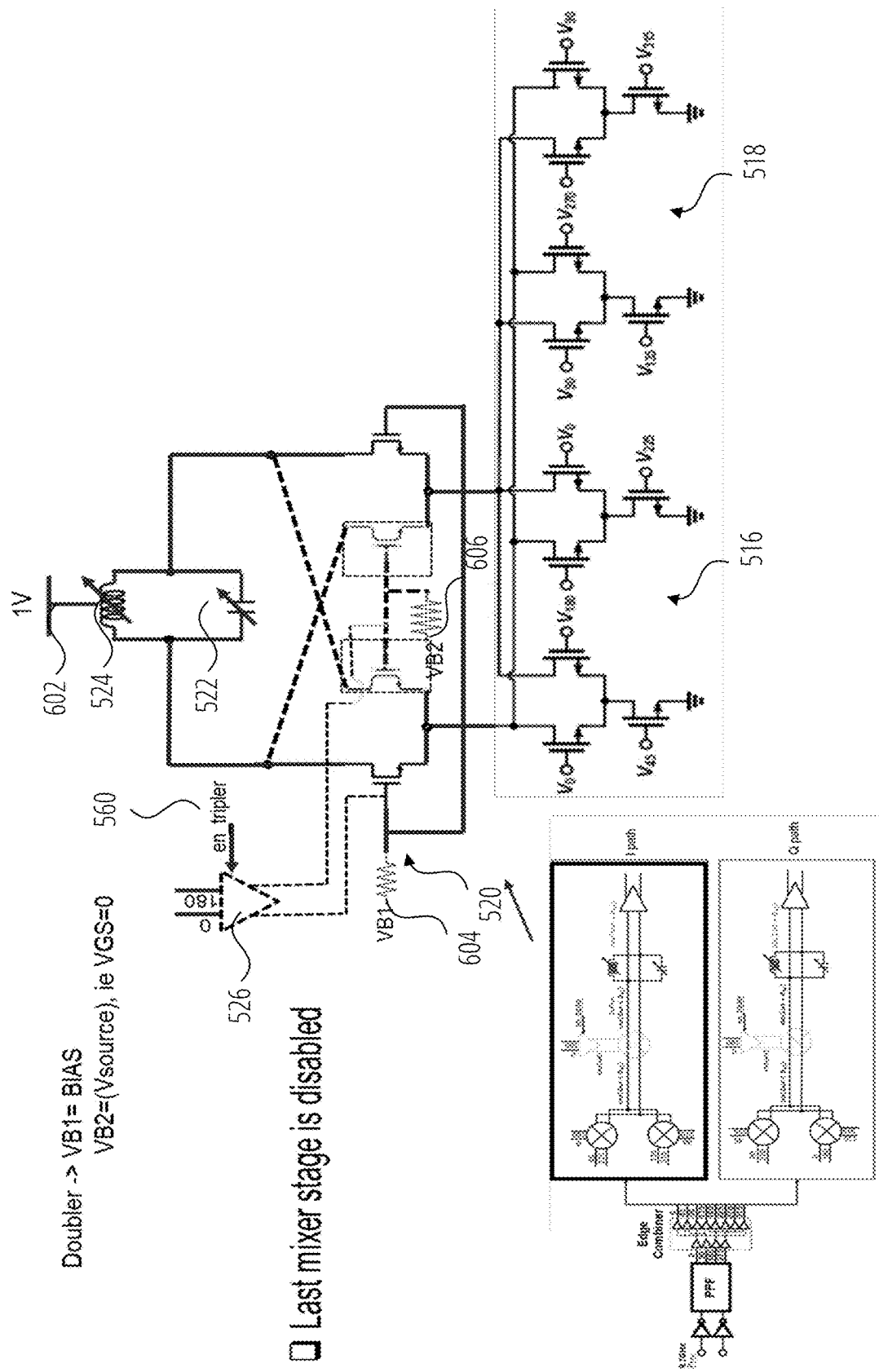
FIG. 8 is a schematic diagram of the LO distribution circuit in the first mode according to at least one embodiment.

FIG. 8 is a schematic diagram of the LO distribution circuit 500 in the first mode (doubler mode) according to at least one embodiment. The LO distribution circuit 500 in FIG. 8 shows the transistors of the first mixer 516, the second mixer 518, and the third mixer 520, the variable capacitor 522, the variable inductor 524, and the buffer circuit 526. The variable inductor 524 is coupled to the DC terminal 602. The gates of the transistors of the third mixer 520 can be coupled to the first bias voltage 604 and the second bias voltage 606, respectively. In at least one embodiment for the frequency doubler, the mixer stage (e.g., third mixer 520) is disabled.

In at least one embodiment, the first bias voltage 604 and the second bias voltage 606 are not equal. In particular, the first bias voltage 604 can be a first bias value, and the second bias voltage 606 can be equal to the voltage source so that the VGS is zero (e.g., Doubler→VB1=BIAS and VB2= (Vsource), i.e., VGS=0). In at least one embodiment, 1/2*LO is rejected by the variable inductor 524 and variable capacitor 522 (also referred to as an output tank), and the proceeding stages act like a mixer and polyphase amplifier (PPA). Although FIG. 8 illustrates the circuitry of the I path 502, similar circuitry can be used for the Q path 504.

As described herein, the variable inductance circuit can be configured to have an inductance that is appropriate for the given mode. That is, the variable inductance circuit can be designed to have two different inductances while minimizing or removing the magnetic coupling between L1 and L2 (the inductive elements) using certain layout structures, such as those described below with respect to FIG. 9 to FIG. 12.

Figure 9:
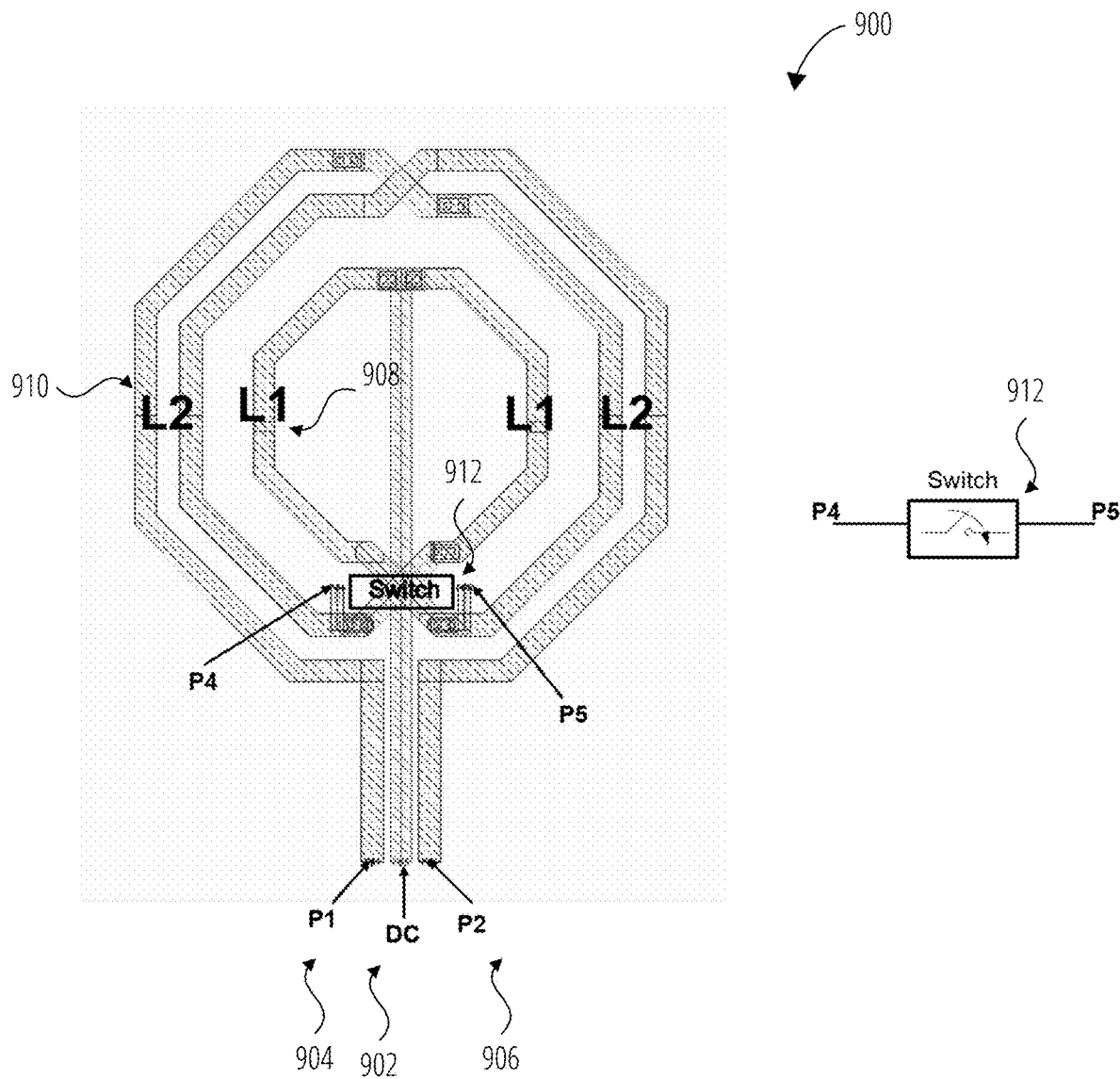
FIG. 9 illustrates a layout structure of a variable inductance circuit according to at least one embodiment.

FIG. 9 illustrates a layout structure of a variable inductance circuit 900 according to at least one embodiment. The variable inductance circuit 900 includes a DC terminal 902, a first terminal 904, a second terminal 906, a first inductor 908 (L1), a second inductor 910 (L2), and a switch 912. The DC terminal 902 is coupled to the first inductor 908. The first inductor 908 includes a first inductive element and a second inductive element that can form an inner loop of the layout structure. A first end of the first inductive element and a first end of the second inductive element are coupled to the DC terminal 902. A second end of the first inductive element and a second end of the inductive element are coupled to the switch 912. When activated, the switch 912 shorts the first inductive element and the second inductive element, where L1 acts as a DC path. The second inductor 910 includes a third inductive element and a fourth inductive element that can form an outer loop of the layout structure. That is, the first inductor 908 can be located within the outer loop of the second inductor 910. The third inductive element is coupled in series with the first inductive element and the first terminal 904, and the fourth inductive element is coupled in series with the second inductive element and the second terminal 906. The third inductive element and the fourth inductive element can cross each other at a distal end from the first terminal 904 and the second terminal 906. The crossing can be considered a twist or a twist in the second inductor 910 layout. The crossing between the third inductive element and the fourth inductive element can be about halfway between the first terminal 904 and the second terminal 906. The layout structure can be implemented on one or more layers of a circuit board.

As described herein, the switch 912 can be activated in the second mode (e.g., tripler mode or TX mode) and shorts the first inductive element and the second inductive element of the first inductor 908. In this mode, the total inductance is the minimum inductance, as expressed in equation (3) above. The switch 912 can be deactivated in the first mode (e.g., doubler mode or RX mode). In this mode, the total inductance is the maximum inductance, as expressed in equation (2) above. The layout structure can minimize or remove magnetic coupling between the first inductor 908 (L1) and the second inductor 910 (L2), as described in more detail below.

Figure 10A:
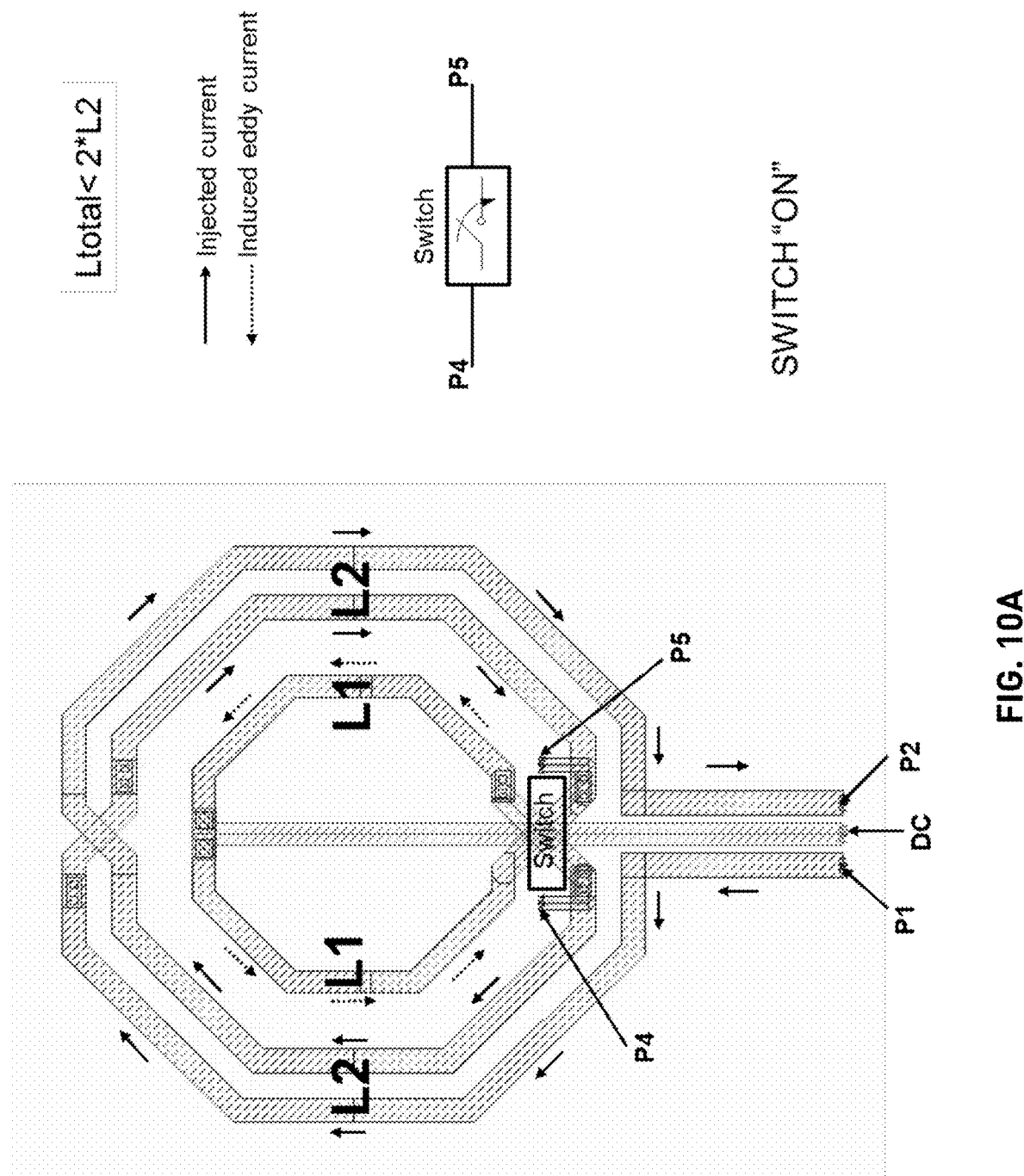
FIG. 10A illustrates an induced eddy current effect on the variable inductance circuit of FIG. 9 in a second mode according to at least one embodiment.

FIG. 10A illustrates an induced eddy current effect on the variable inductance circuit 900 of FIG. 9 in a second mode according to at least one embodiment. When the switch 912 is turned ON (tripler or TX mode), L1 terminals are shorted. Electrical excitation is applied on L2 terminals, and since L1 terminals are shorted, it is induced with an opposite electrical field. This causes the magnetic field of L1 and L2 to be opposite in direction, also termed the eddy current effect. This can lead to a reduction of inductance and degradation of an inductance quality factor of the inductor L2. In some cases, this eddy current effect is not favorable as it is hard to achieve a high inductor quality factor at high frequency for the tripler mode (TX mode).

Figure 10B:
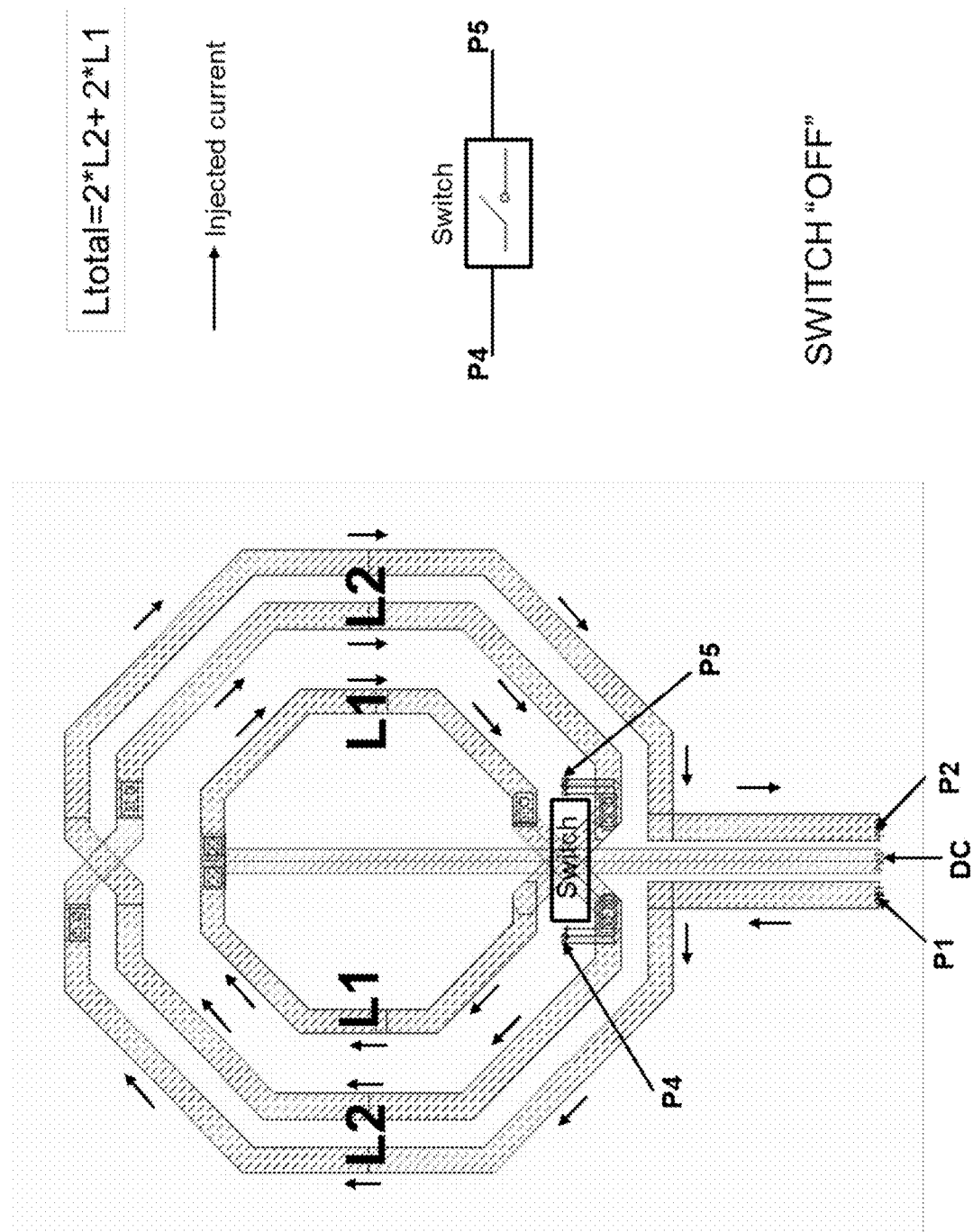
FIG. 10B illustrates an injected current on the variable inductance circuit of FIG. 9 in a first mode (doubler) according to at least one embodiment.

FIG. 10B trates an injected current on the variable inductance circuit of FIG. 9 in a first mode (doubler) according to at least one embodiment. When the switch is turned OFF (doubler and RX mode), there is no impairment since the magnetic field of L1 and L2 are in the same direction.

Figure 11:
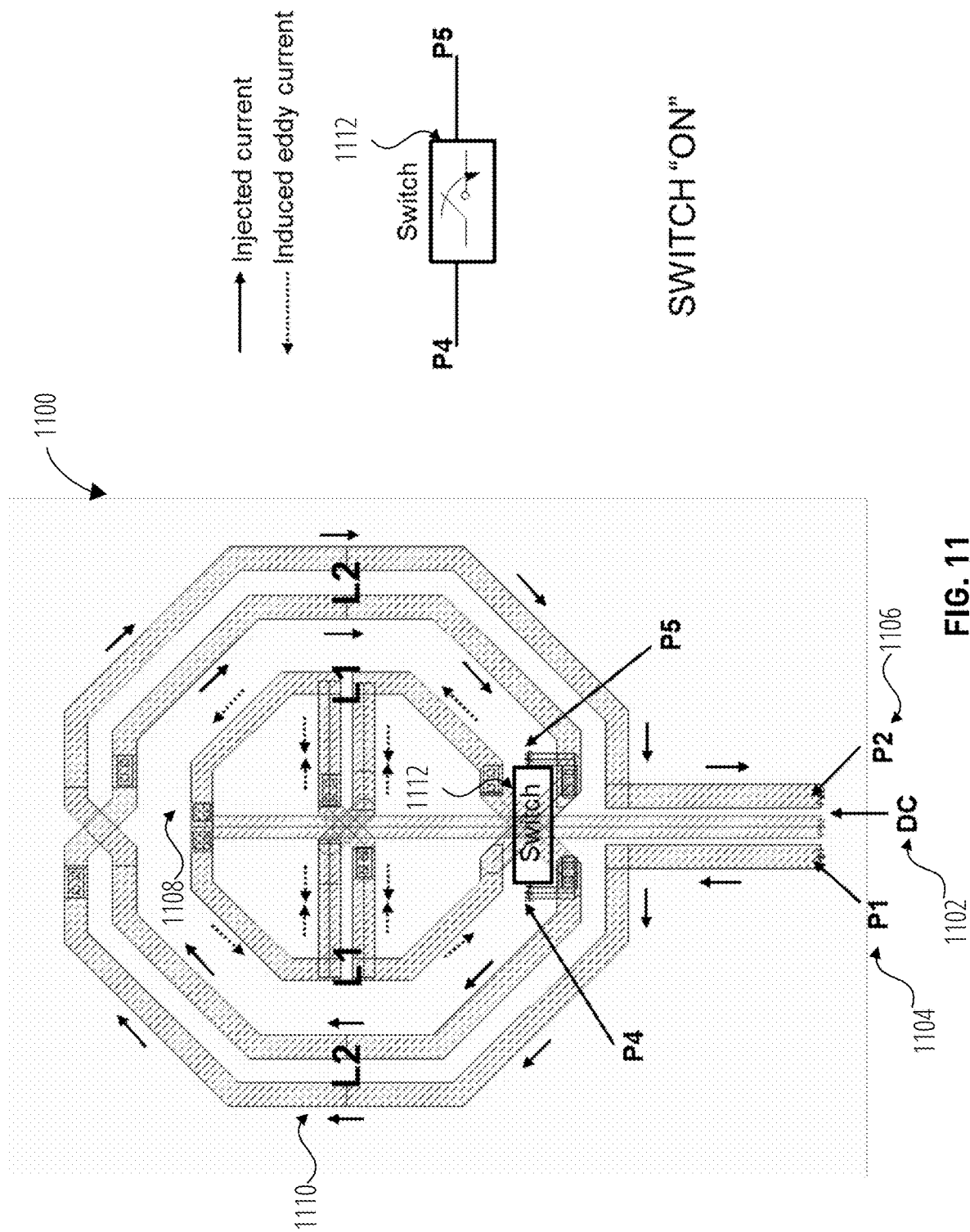
FIG. 11 illustrates a layout structure of a variable inductance circuit and an induced eddy current effect being canceled out in a second mode according to at least one embodiment.

In at least one embodiment, twisting the first inductor L1, as described and illustrated with respect to FIG. 11, the eddy current cannot flow as the induced current on L1 cancels each other out. Hence, the inductance quality factor of the inductor L2 in the tripler mode (TX mode) is preserved.

FIG. 11 illustrates a layout structure of a variable inductance circuit 1100 and an induced eddy current effect being canceled out in a second mode according to at least one embodiment. The variable inductance circuit 1100 includes a DC terminal 1102, a first terminal 1104, a second terminal 1106, a first inductor 1108 (L1), a second inductor 1110 (L2), and a switch 1112. The DC terminal 1102 is coupled to the first inductor 1108. The first inductor 1108 includes a first inductive element and a second inductive element that can form an inner loop of the layout structure. The first and second inductive elements can be twisted at a center so that the flow of the induced current on L1 cancels each other out in the second mode. A first end of the first inductive element and a first end of the second inductive element are coupled to the DC terminal 1102. A second end of the first inductive element and a second end of the inductive element are coupled to the switch 1112. When activated, the switch 1112 shorts the first inductive element and the second inductive element, where L1 acts as a DC path. The second inductor 1110 includes a third inductive element and a fourth inductive element that can form an outer loop of the layout structure. That is, the first inductor 1108 can be located within the outer loop of the second inductor 1110. The third inductive element is coupled in series with the first inductive element and the first terminal 1104, and the fourth inductive element is coupled in series with the second inductive element and the second terminal 1106. The third inductive element and the fourth inductive element can cross each other at a distal end from the first terminal 1104 and the second terminal 1106. The crossing can be considered a twist or a twist in the first inductor 908 layout. The crossing between the third inductive element and the fourth inductive element can be about halfway between the first terminal 1104 and the second terminal 1106. The layout structure can be implemented on one or more layers of a circuit board.

As described herein, the switch 1112 can be activated in the second mode (e.g., tripler mode or TX mode) and shorts the first inductive element and the second inductive element of the first inductor 1108. In this mode, the total inductance is the minimum inductance, as expressed in equation (3) above. The switch 1112 can be deactivated in the first mode (e.g., doubler mode or RX mode). In this mode, the total inductance is the maximum inductance, as expressed in equation (2) above. The layout structure can minimize or remove magnetic coupling between the first inductor 1108 (L1) and the second inductor 1110 (L2).

Figure 12:
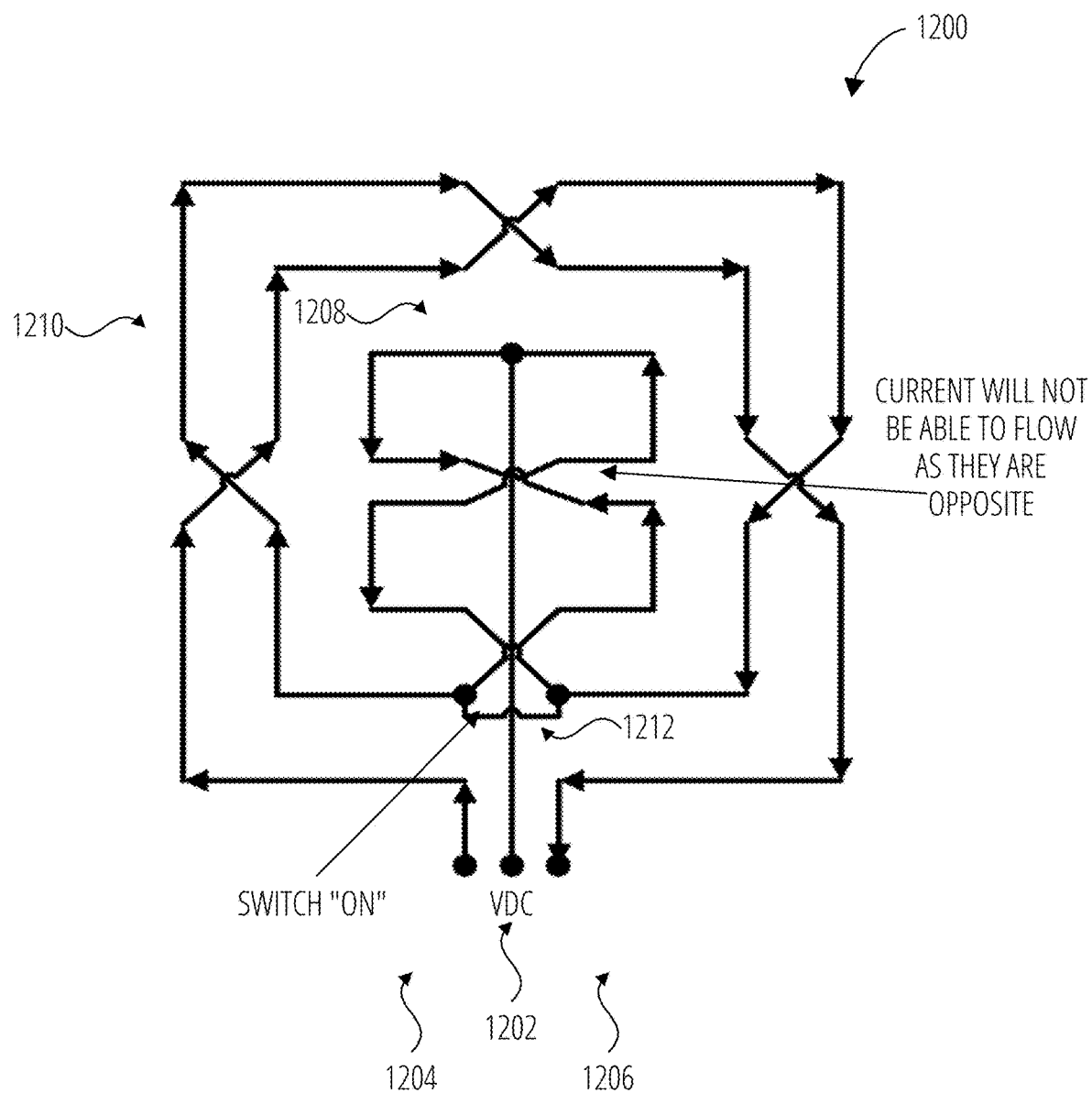
FIG. 12 illustrates a layout structure of a variable inductance circuit and an induced eddy current effect being canceled out in a second mode according to at least one embodiment.

FIG. 12 illustrates a layout structure of a variable inductance circuit 1200 and an induced eddy current effect being canceled out in a second mode according to at least one embodiment. The variable inductance circuit 1200 includes a DC terminal 1202, a first terminal 1204, a second terminal 1206, a first inductor 1208 (L1), a second inductor 1210 (L2), and a switch 1212. The DC terminal 1202 is coupled to the first inductor 1208. The first inductor 1208 includes a first inductive element and a second inductive element that can form an inner loop of the layout structure. The first and second inductive elements can be twisted at a center so that the flow of the induced current on L1 cancels each other out in the second mode. A first end of the first inductive element and a first end of the second inductive element are coupled to the DC terminal 1202. A second end of the first inductive element and a second end of the inductive element are coupled to the switch 1212. When activated, the switch 1212 shorts the first inductive element and the second inductive element, where L1 acts as a DC path. The second inductor 1210 includes a third inductive element and a fourth inductive element that can form an outer loop of the layout structure. That is, the first inductor 1208 can be located within the outer loop of the second inductor 1210. The third inductive element is coupled in series with the first inductive element and the first terminal 1204, and the fourth inductive element is coupled in series with the second inductive element and the second terminal 1206. The third inductive element and the fourth inductive element can cross each other at a distal end from the first terminal 1204 and the second terminal 1206. The crossing can be considered a twist or a twist in the first inductor 1208 layout. The crossing between the third inductive element and the fourth inductive element can be about halfway between the first terminal 1204 and the second terminal 1206. The layout structure can be implemented on one or more layers of a circuit board.

As described herein, the switch 1212 can be activated in the second mode (e.g., tripler mode or TX mode) and shorts the first inductive element and the second inductive element of the first inductor 1208. In this mode, the eddy current induced on the first inductor 1208 is canceled out, and the current cannot flow since they are in opposite directions.

Figure 13:
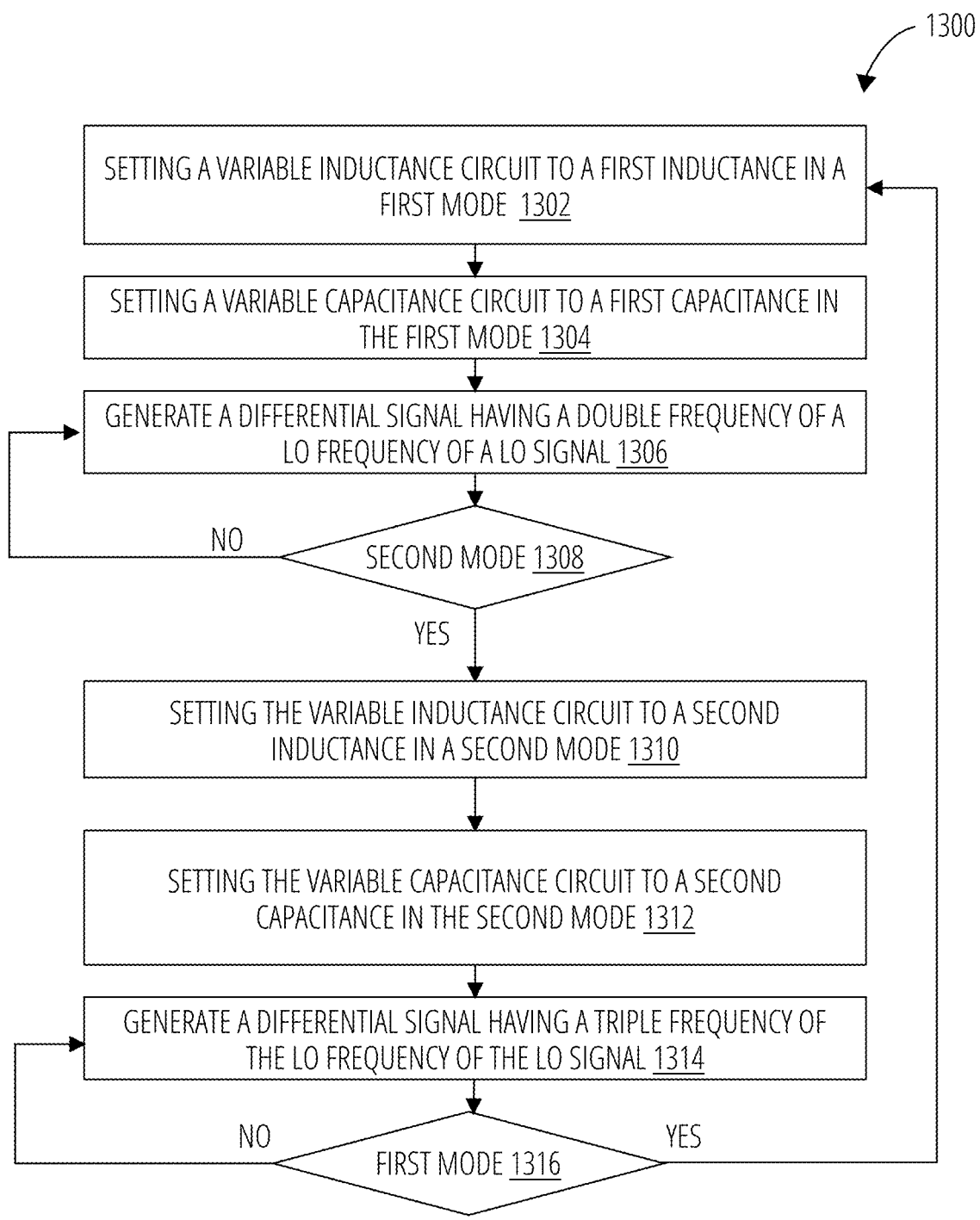
FIG. 13 is a flow diagram of a method for frequency multiplying a LO signal in a first mode or a second mode according to at least one embodiment.

FIG. 13 is a flow diagram of a method 1300 for frequency multiplying a LO signal in a first mode or a second mode according to at least one embodiment. Method 1300 may be performed by processing elements or processing logic that may comprise hardware (circuitry, dedicated logic, etc.), software (such as executing on a general-purpose computer system or a dedicated machine), or any combination thereof. In one embodiment, method 1300 is performed on a communication device of a customer terminal (CT), such as CT 102 of FIG. 1. In another implementation, the method 1300 is performed by LO distribution circuit 116 of FIG. 1. In one embodiment, one or more blocks of FIG. 13 are performed by a processing device of the CT 102, while in some other implementations, one or more blocks of FIG. 13 may be performed by one or more other machines not depicted in the figures.

Referring to FIG. 13, the method 1300 begins with the processing logic setting a variable inductance circuit to a first inductance in a first mode (e.g., RX mode) (block 1302). The processing logic sets a variable capacitance circuit to a first capacitance in the first mode (block 1304). The processing logic generates a differential signal having a double frequency of a LO frequency of a LO signal (block 1306). The processing logic determines if the communication device has switched from the first mode to a second mode (block 1308). If not, the processing logic can continue to generate the differential signal at block 1306. If the processing logic determines that the communication device has switched to the second mode at block 1308, the processing logic sets the variable inductance circuit to a second inductance in the second mode (e.g., TX mode) (block 1310). The processing logic sets the variable capacitance circuit to a second capacitance in the second mode (block 1312). The processing logic generates a differential signal having a triple frequency of the LO frequency of the LO signal (block 1314). The processing logic determines if the communication device has switched from the second mode to the first mode (block 1316). If not, the processing logic can continue to generate the differential signal at block 1314. If the processing logic determines that the communication device has switched to the first mode at block 1316, the processing logic returns to block 1302 to set the variable inductance circuit to the first inductance value.

Figure 14:
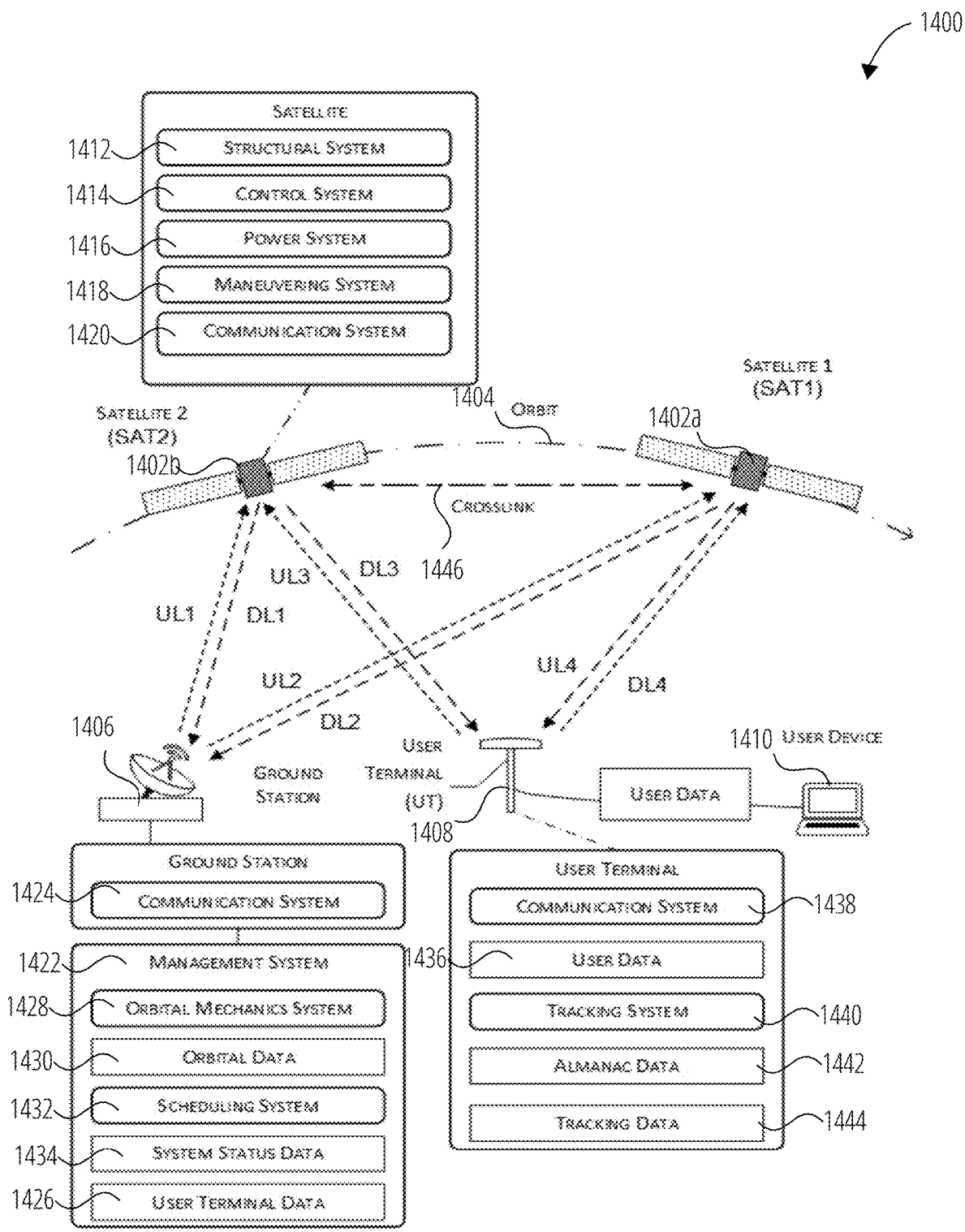
FIG. 14 illustrates a portion of a communication system that includes two satellites of a constellation of satellites, each satellite being in orbit, according to embodiments of the present disclosure.

FIG. 14 illustrates a portion of a communication system 1400 that includes two satellites of a constellation of satellites 1402a, 1402b, ..., etc., each satellite 1402 being in orbit 1404 according to embodiments of the present disclosure. The system 1400 shown here comprises a plurality (or "constellation") of satellites 1402a, 1402b, ..., etc., each satellite 1402 being in orbit 1404 as part of a satellite network, such as satellite network 100 of FIG. 1. Also shown is a ground station 1406, a user terminal (UT) 1408 (also referred to herein as customer terminal (CT)), and a user device 1410.

The constellation may comprise hundreds or thousands of satellites 1402, in various orbits 1404. For example, one or more of these satellites 1402 may be in non-geosynchronous orbits (NGOs) in which they are in constant motion with respect to the Earth. For example, the orbit 1404 is a low earth orbit (LEO). In this illustration, orbit 1404 is depicted with an arc pointed to the right. A first satellite (SAT1) 1402a is leading (ahead of) a second satellite (SAT2) 1402b in the orbit 1404.

The satellite 1402 may comprise a structural system 1412, a control system 1414, a power system 1416, a maneuvering system 1418, and a communication system 1420. In other implementations, some systems may be omitted, or other systems added. One or more of these systems may be communicatively coupled with one another in various combinations.

The structural system 1412 comprises one or more structural elements to support the operation of the satellite 1402. For example, the structural system 1412 may include trusses, struts, panels, and so forth. The components of other systems may be affixed to or housed by the structural system 1412. For example, the structural system 1412 may provide mechanical mounting and support for solar panels in the power system 1416. The structural system 1412 may also provide for thermal control to maintain components of the satellite 1402 within operational temperature ranges. For example, the structural system 1412 may include louvers, heat sinks, radiators, and so forth.

The control system 1414 provides various services, such as operating the onboard systems, resource management, providing telemetry, processing commands, and so forth. For example, the control system 1414 may direct the operation of the communication system 920.

The power system 1416 provides electrical power to operate the components onboard the satellite 1402. The power system 1416 may include components to generate electrical energy. For example, the power system 1416 may comprise one or more photovoltaic cells, thermoelectric devices, fuel cells, and so forth. The power system 1416 may include components to store electrical energy. For example, the power system 1416 may comprise one or more batteries, fuel cells, and so forth.

The maneuvering system 1418 maintains the satellite 1402 in one or more of a specified orientation or orbit 1404. For example, the maneuvering system 1418 may stabilize the satellite 1402 with respect to one or more axis. In another example, the maneuvering system 1418 may move the satellite 1402 to a specified orbit 1404. The maneuvering system 1418 may include one or more computing devices, sensors, thrusters, momentum wheels, solar sails, drag devices, and so forth. For example, the sensors of the maneuvering system 1418 may include one or more global navigation satellite system (GNSS) receivers, such as global positioning system (GPS) receivers, to provide information about the position and orientation of the satellite 1402 relative to Earth. In another example, the sensors of the maneuvering system 1418 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 1420 provides communication with one or more other devices, such as other satellites 1402, ground stations 1406, user terminals 1408, and so forth. The communication system 1420 may include one or more modems, digital signal processors, power amplifiers, antennas (including at least one antenna that implements multiple antenna elements, such as a phased array antenna and an embedded calibration antenna), processors, memories, storage devices, communications peripherals, interface buses, and so forth. Such components support communications with other satellites 1402, ground stations 1406, user terminals 1408, and so forth, using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 1420 may be output to other systems, such as the control system 1414, for further processing. Output from a system, such as the control system 1414, may be provided to the communication system 1420 for transmission.

One or more ground stations 1406 are in communication with one or more satellites 1402. The ground stations 1406 may pass data between the satellites 1402, a management system 1422, networks such as the Internet, and so forth. The ground stations 1406 may be emplaced on land, on vehicles, at sea, and so forth. Each ground station 1406 may comprise a communication system 1424. Each ground station 1406 may use the communication system 1424 to establish communication with one or more satellites 1402, other ground stations 1406, and so forth. The ground station 1406 may also be connected to one or more communication networks. For example, the ground station 1406 may connect to a terrestrial fiber optic communication network. The ground station 1406 may act as a network gateway, passing user data 1436 or other data between the one or more communication networks and the satellites 1402. Such data may be processed by the ground station 1406 and communicated via the communication system 1424. The communication system 1424 of a ground station may include components similar to those of the communication system 1420 of a satellite 1402 and may perform similar communication functionalities. For example, the communication system 1424 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 1406 are in communication with a management system 1422. The management system 1422 is also in communication, via the ground stations 1406, with the satellites 1402 and the UTs 1408. The management system 1422 coordinates the operation of the satellites 1402, ground stations 1406, UTs 1408, and other resources of the communication system 1400. The management system 1422 may comprise one or more of an orbital mechanics system 1428 or a scheduling system 1432. In some embodiments, the scheduling system 1432 can operate in conjunction with an HD controller.

The orbital mechanics system 1428 determines orbital data 1430 that is indicative of a state of a particular satellite 1402 at a specified time. In one implementation, the orbital mechanics system 1428 may use orbital elements that represent characteristics of the orbit 1404 of the satellites 1402 in the constellation to determine the orbital data 1430 that predicts location, velocity, and so forth of particular satellites 1402 at particular times or time intervals. For example, the orbital mechanics system 1428 may use data obtained from actual observations from tracking stations, data from the satellites 1402, scheduled maneuvers, and so forth to determine the orbital elements. The orbital mechanics system 1428 may also consider other data, such as space weather, collision mitigation, orbital elements of known debris, and so forth.

The scheduling system 1432 schedules resources to provide communication to the UTs 1408. For example, the scheduling system 1432 may determine handover data that indicates when communication is to be transferred from the first satellite 1402a to the second satellite 1402b. Continuing the example, the scheduling system 1432 may also specify communication parameters such as frequency, timeslot, and so forth. During operation, the scheduling system 932 may use information such as the orbital data 1430, system status data 1434, user terminal data 1426, and so forth.

The system status data 1434 may comprise information such as which UTs 1408 are currently transferring data, satellite availability, current satellites 1402 in use by respective UTs 1408, capacity available at particular ground stations 1406, and so forth. For example, the satellite availability may comprise information indicative of satellites 1402 that are available to provide communication service or those satellites 1402 that are unavailable for communication service. Continuing the example, a satellite 1402 may be unavailable due to malfunction, previous tasking, maneuvering, and so forth. The system status data 1434 may be indicative of past status, predictions of future status, and so forth. For example, the system status data 1434 may include information such as projected data traffic for a specified interval of time based on previous transfers of user data 1436. In another example, the system status data 1434 may be indicative of future statuses, such as a satellite 1402 being unavailable to provide communication service due to scheduled maneuvering, scheduled maintenance, scheduled decommissioning, and so forth.

The user terminal data 1426 may comprise information such as a location of a particular UT 1408. The user terminal data 1426 may also include other information, such as a priority assigned to user data 1436 associated with that UT 1408, information about the communication capabilities of that particular UT 1408, and so forth. For example, a particular UT 1408 in use by a business may be assigned a higher priority relative to a UT 1408 operated in a residential setting. Over time, different versions of UTs 1408 may be deployed, having different communication capabilities such as being able to operate at particular frequencies, supporting different signal encoding schemes, having different antenna configurations, and so forth.

The UT 1408 includes a communication system 1438 to establish communication with one or more satellites 1402. The communication system 1438 of the UT 1408 may include components similar to those of the communication system 1420 of a satellite 1402 and may perform similar communication functionalities. For example, the communication system 1438 may include one or more modems, digital signal processors, power amplifiers, antennas (including at least one antenna that implements multiple antenna elements, such as a phased array antenna), processors, memories, storage devices, communications peripherals, interface buses, and so forth. The UT 1408 passes user data 1436 between the constellation of satellites 1402 and the user device 1410. The user data 1436 includes data originated by the user device 1410 or addressed to the user device 1410. The UT 1408 may be fixed or in motion. For example, the UT 1408 may be used at a residence or on a vehicle such as a car, boat, aerostat, drone, airplane, and so forth.

The UT 1408 includes a tracking system 1440. The tracking system 1440 uses almanac data 1442 to determine tracking data 1444. The almanac data 1442 provides information indicative of orbital elements of the orbit 1404 of one or more satellites 1402. For example, the almanac data 942 may comprise orbital elements such as "two-line element" data for the satellites 1402 in the constellation that are broadcast or otherwise sent to the UTs 1408 using the communication system 1438.

The tracking system 1440 may use the current location of the UT 1408 and the almanac data 1442 to determine the tracking data 1444 for the satellite 1402. For example, based on the current location of the UT 1408 and the predicted position and movement of the satellites 1402, the tracking system 1440 can calculate the tracking data 1444. The tracking data 1444 may include information indicative of azimuth, elevation, distance to the second satellite, time of flight correction, or other information at a specified time. The determination of the tracking data 1444 may be ongoing. For example, the first UT 1408 may determine tracking data 1444 every 1000 ms, every second, every five seconds, or at other intervals.

With regard to FIG. 14, an uplink is a communication link that allows data to be sent to a satellite 1402 from a ground station 1406, UT 1408, or a device other than another satellite 1402. Uplinks are designated as UL1, UL2, UL3, and so forth. For example, UL1 is a first uplink from the ground station 1406 to the second satellite 1402b. In comparison, a downlink is a communication link that allows data to be sent from the satellite 1402 to a ground station 1406, UT 1408, or device other than another satellite 1402. For example, DL1 is a first downlink from the second satellite 1402b to the ground station 1406. The satellites 1402 may also be in communication with one another. For example, a crosslink 1446 provides for communication between satellites 1402 in the constellation.

The satellite 1402, the ground station 1406, the user terminal 1408, the user device 1410, the management system 1422, or other systems described herein may include one or more computing devices or computer systems comprising one or more hardware processors, computer-readable storage media, and so forth. For example, the hardware processors may include application-specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components.

In one embodiment, the system memory stores instructions of methods to control the operation of the electronic device. The electronic device performs functions by using the processor(s) to execute instructions provided by the system memory. Embodiments may be provided as a software program or computer program, including a non-transitory computer-readable storage medium having stored thereon instructions (in compressed or uncompressed form) that may be used to program a computer (or other electronic devices) to perform the processes or methods described herein. The computer-readable storage medium may be one or more of an electronic storage medium, a magnetic storage medium, an optical storage medium, a quantum storage medium, and so forth. For example, the computer-readable storage medium may include but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product, including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise the transmission of software by the Internet.

Figure 15:
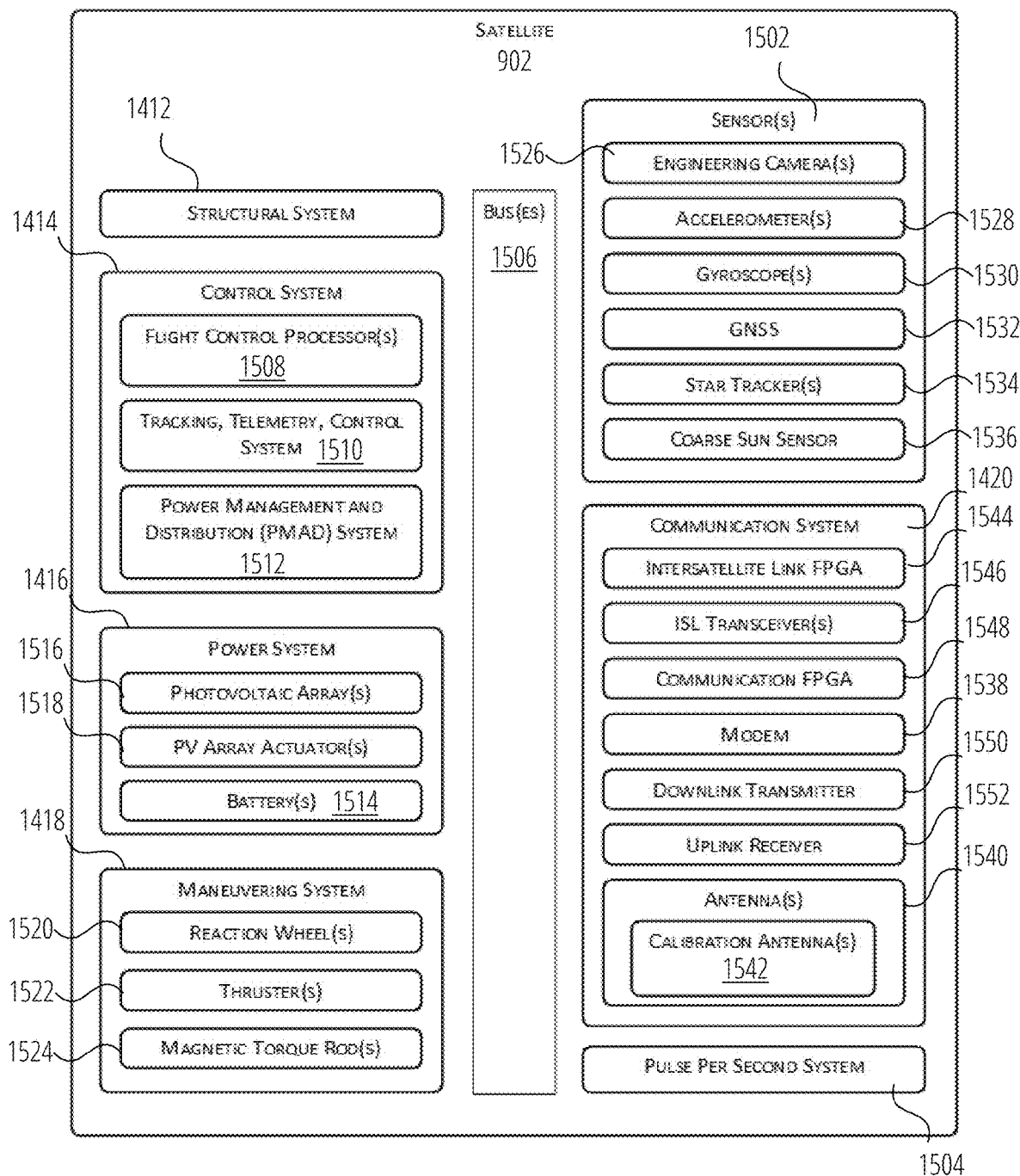
FIG. 15 is a functional block diagram of some systems associated with the satellite, according to some implementations.

FIG. 15 is a functional block diagram of some systems associated with the satellite 1402, according to some implementations. The satellite 1402 may comprise a structural system 1412, a control system 1414, a power system 1416, a maneuvering system 1418, one or more sensor(s) 1502, and a communication system 1420. A pulse per second (PPS) system 1504 may be used to provide a timing reference to the systems onboard the satellite 1402. One or more bus(es) 1506 may be used to transfer data between the systems onboard the satellite 1402. In some implementations, redundant buses may be provided. The bus(es) 1506 may include but are not limited to, data busses such as Controller Area Network Flexible Data Rate (CAN FD), Ethernet, Serial Peripheral Interface (SPI), and so forth. In some implementations, the bus(es) 1506 may carry other signals. For example, a radio frequency bus may comprise a coaxial cable, waveguides, and so forth to transfer radio signals from one part of the satellite 1402 to another. In other implementations, some systems may be omitted, or other systems added. One or more of these systems may be communicatively coupled with one another in various combinations.

The structural system 1412 comprises one or more structural elements to support the operation of the satellite 1402. For example, the structural system 1412 may include trusses, struts, panels, and so forth. The components of other systems may be affixed to or housed by the structural system 1412. For example, the structural system 1412 may provide mechanical mounting and support for solar panels in the power system 1416. The structural system 1412 may also provide for thermal control to maintain components of the satellite 1402 within operational temperature ranges. For example, the structural system 1402 may include louvers, heat sinks, radiators, and so forth.

The control system 1414 provides various services, such as operating the onboard systems, resource management, providing telemetry, processing commands, and so forth. For example, the control system 1414 may direct the operation of the communication system 1420. The control system 1414 may include one or more flight control processors 1508. The flight control processors 1508 may comprise one or more processors, FPGAs, and so forth. A tracking, telemetry, and control (TTC) system 1510 may include one or more processors, radios, and so forth. For example, the TTC system 1510 may comprise a dedicated radio transmitter and receiver to receive commands from a ground station 1406, send telemetry to the ground station 1406, and so forth. A power management and distribution (PMAD) system 1512 may direct the operation of the power system 1416, control distribution of power to the systems of the satellite 1402, control battery 1514 charging, and so forth.

The power system 1416 provides electrical power to operate the components onboard the satellite 1402. The power system 1416 may include components to generate electrical energy. For example, the power system 1416 may comprise one or more photovoltaic arrays 1516 comprising a plurality of photovoltaic cells, thermoelectric devices, fuel cells, and so forth. One or more PV array actuators 1518 may be used to change the orientation of the photovoltaic array(s) 1516 relative to the satellite 1402. For example, the PV array actuator 1518 may comprise a motor. The power system 1416 may include components to store electrical energy. For example, the power system 1416 may comprise one or more batteries 1514, fuel cells, and so forth.

The maneuvering system 1418 maintains the satellite 1402 in one or more of a specified orientation or orbit 1404. For example, the maneuvering system 1418 may stabilize the satellite 1402 with respect to one or more axes. In another example, the maneuvering system 1418 may move the satellite 1402 to a specified orbit 1404. The maneuvering system 1418 may include one or more of reaction wheel(s) 1520, thrusters 1522, magnetic torque rods 1524, solar sails, drag devices, and so forth. The thrusters 1522 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellent, using electrical power obtained from the power system 916 to expel the water and produce thrust. During operation, the maneuvering system 1418 may use data obtained from one or more of the sensor(s) 1502.

The satellite 1402 includes one or more sensor(s) 1502. The sensor(s) 1502 may include one or more engineering cameras 1526. For example, an engineering camera 1526 may be mounted on the satellite 1402 to provide images of at least a portion of the photovoltaic PV array 1516. Accelerometer(s) 1528 provide information about the acceleration of the satellite 1402 along one or more axes. Gyroscope(s) 1530 provide information about the rotation of the satellite 1402 with respect to one or more axes. The sensor(s) 1502 may include a global navigation satellite system (GNSS) receiver 1532, such as a Global Positioning System (GPS) receiver, to provide information about the position of the satellite 1402 relative to Earth. In some implementations, the GNSS 1532 may also provide information indicative of velocity, orientation, and so forth. One or more star tracker(s) 1534 may be used to determine an orientation of the satellite 1402. A coarse sun sensor 1536 may be used to detect the sun, provide information on the relative position of the sun with respect to the satellite 1402, and so forth. The satellite 1402 may include other sensor(s) 1502 as well. For example, the satellite 1402 may include a horizon detector, radar, lidar, and so forth.

The communication system 1420 provides communication with one or more other devices, such as other satellites 1402, ground stations 1406, user terminals 1408, and so forth. The communication system 1420 may include one or more modems 1538, digital signal processors, power amplifiers, antennas antenna 1540 (including a calibration antenna 1542), such as a phased array antenna), processors, memories, storage devices, communications peripherals, interface buses, and so forth. Such components support communications with other satellites 1402, ground stations 1406, user terminals 1408, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 1420 may be output to other systems, such as the control system 1414, for further processing. Output from a system, such as the control system 1414, may be provided to the communication system 1420 for transmission.

The communication system 1420 may include hardware to support the crosslink 1446 (e.g., intersatellite link). For example, an intersatellite link FPGA 1544 may be used to modulate data sent and received by one or more ISL transceiver(s) 1546 to send data between satellites 1402. The ISL transceiver(s) 1546 may operate using radio frequencies, optical frequencies, and so forth.

A communication FPGA 1548 may be used to facilitate communication between the satellite 1402 and the ground stations 1406, UTs 1408, and so forth. For example, the communication FPGA 1548 may direct the operation of a modem 1538 to modulate signals sent using a downlink transmitter 1550 and demodulate signals received using an uplink receiver 1552. The satellite 1402 may include one or more antennas antenna 1540. For example, one or more parabolic antennas may be used to provide communication between the satellite 1402 and one or more ground stations 1406. In another example, a phased array antenna may be used to provide communication between the satellite 1402 and the UTs 1408.

Figure 16:
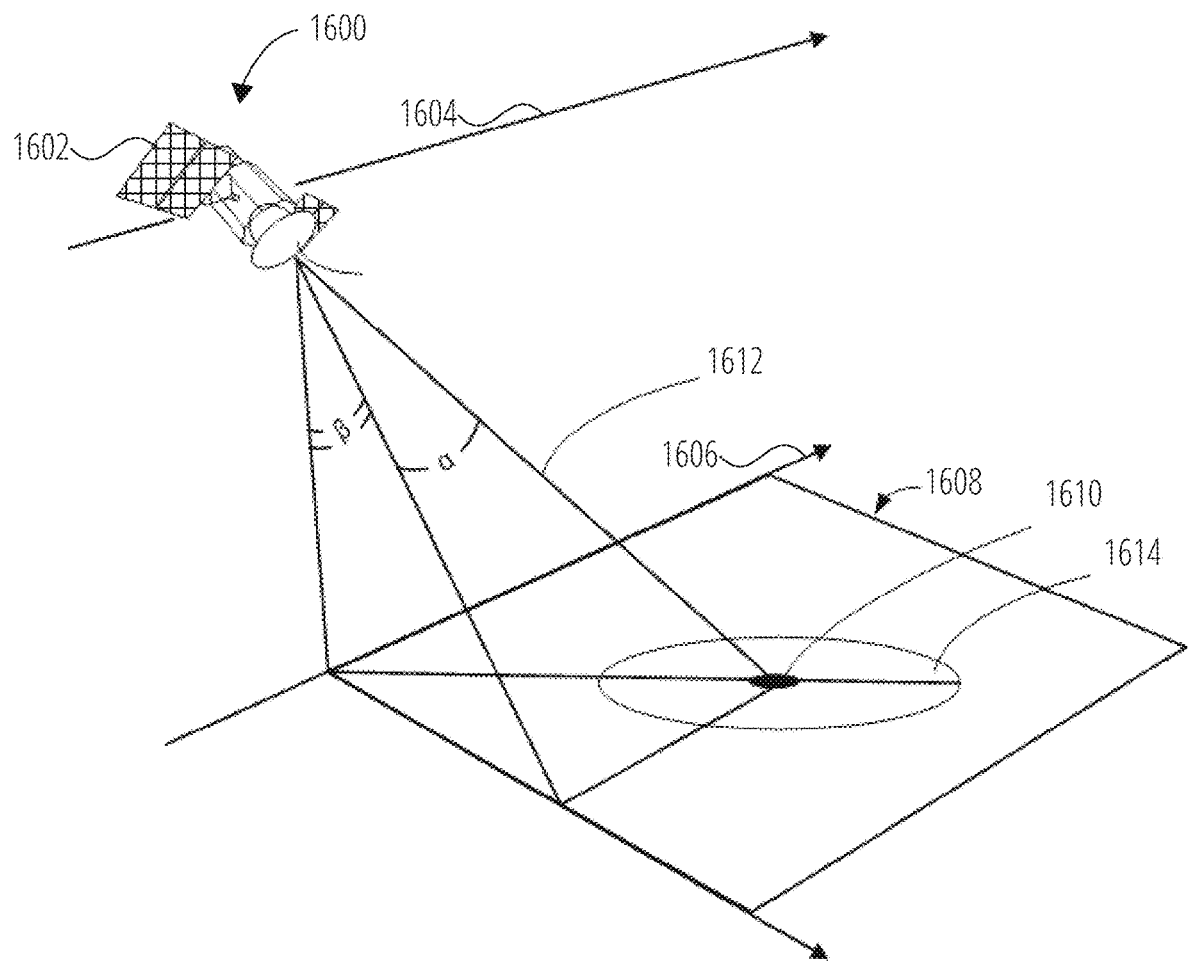
FIG. 16 illustrates a satellite including an antenna system that is steerable, according to embodiments of the present disclosure.

FIG. 16 illustrates the satellite 1600 including an antenna system 1602 that is steerable according to embodiments of the present disclosure. The satellite 1600 can be the SAT 104 of the satellite network 100 of FIG. 1. The antenna system 1602 may include multiple antenna elements that form an antenna and that can be mechanically or electrically steered individually, collectively, or a combination thereof. In an example, the antenna is a phased array antenna.

In orbit 1404, the satellite 1600 follows a path 1604, the projection of which onto the surface of the Earth forms a ground path 1606. In the example illustrated in FIG. 16, the ground path 1606 and a projected axis extending orthogonally from the ground path 1606 at the position of the satellite 1600, together define a region 1608 of the surface of the Earth. In this example, the satellite 1600 can establish uplink and downlink communications with one or more of ground stations, user terminals, or other devices within the region 1608. In some embodiments, the region 1608 may be located in a different relative position to the ground path 1606 and the position of the satellite 1600. For example, the region 1608 may describe a region of the surface of the Earth directly below the satellite 1600. Furthermore, embodiments may include communications between the satellite 1600, an airborne communications system, and so forth.

As shown in FIG. 16, a communication target 1610 (e.g., a ground station, a user terminal, or a CT (such as an HD CT)) is located within the region 1608. The satellite 1600 controls the antenna system 1602 to steer transmission and reception of communications signals to selectively communicate with the communication target 1610. For example, in a downlink transmission from the satellite 1600 to the communication target 1610, a signal beam 1612 emitted by the antenna system 1602 is steerable within an area 1614 of the region 1608. In some implementations, the signal beam 1612 may include multiple subbeams. The extent of the area 1614 defines an angular range within which the signal beam 1612 is steerable, where the direction of the signal beam 1612 is described by a beam angle "α" relative to a surface normal vector of the antenna system 1602. In two-dimensional phased array antennas, the signal beam 1612 is steerable in two dimensions, described in 15 by a second angle "β" orthogonal to the beam angle α. In this way, the area 1614 is a two-dimensional area within the region 1608, rather than a linear track at a fixed angle determined by the orientation of the antenna system 1602 relative to the ground path 1606.

In FIG. 16, as the satellite 1600 follows the path 1604, the area 1614 tracks along the surface of the Earth. In this way, the communication target 1610, which is shown centered in the area 1614 for clarity, is within the angular range of the antenna system 1602 for a period of time. During that time, signals communicated between the satellite 1600 and the communication target 1610 are subject to bandwidth constraints, including but not limited to signal strength and calibration of the signal beam 1612. In an example, for phased array antenna systems, the signal beam 1612 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 17:
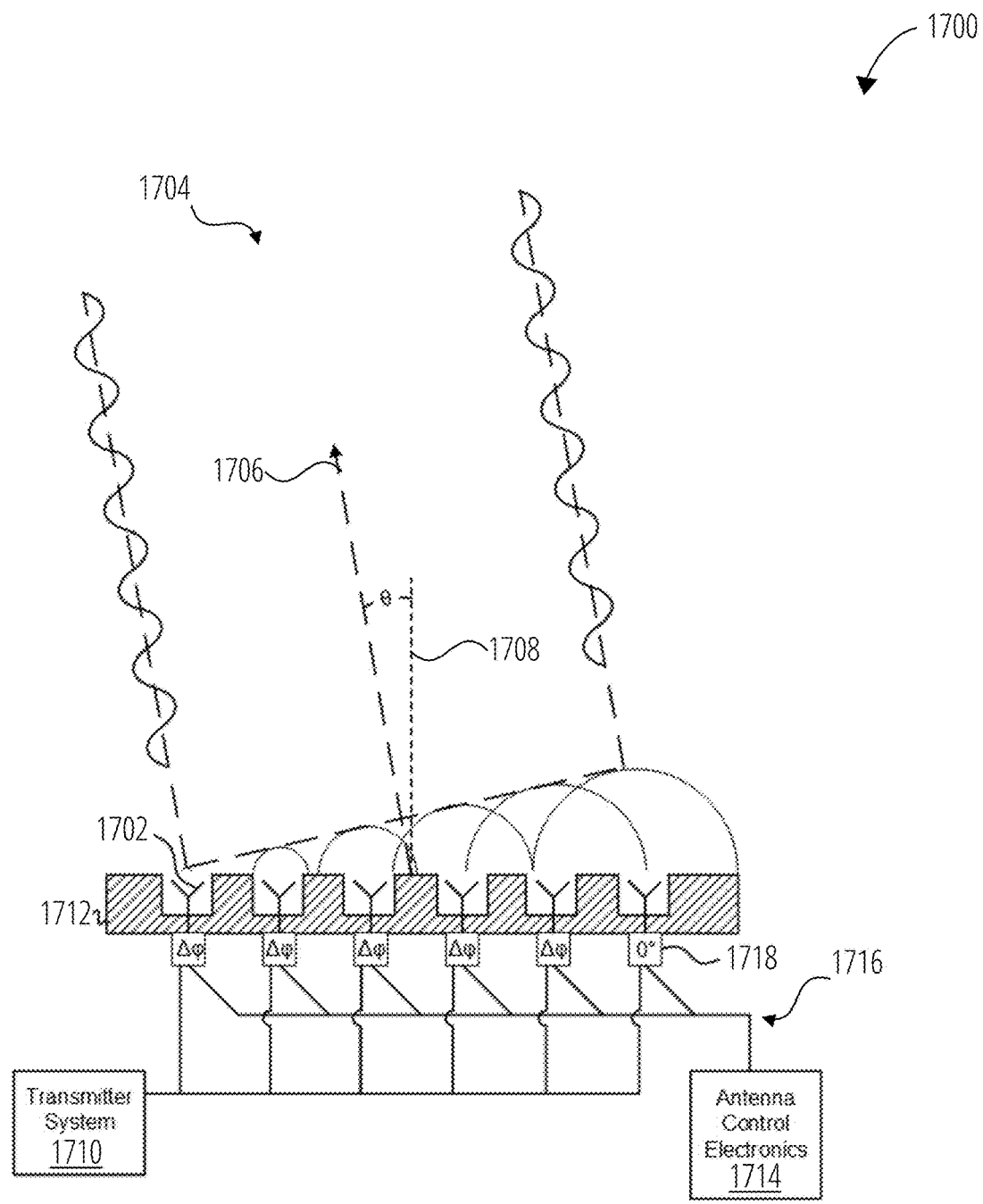
FIG. 17 illustrates a simplified schematic of an antenna according to embodiments of the present disclosure.

FIG. 17 illustrates a simplified schematic of an antenna 1700, according to embodiments of the present disclosure. The antenna 1700 may be a component of the antenna system 1602 of FIG. 16. As illustrated, the antenna 1700 is a phased array antenna that includes multiple antenna elements 1702. Interference between the antenna elements 1702 forms a directional radiation pattern in both transmitter and receiver arrays, forming a beam 1704 (beam extents shown as dashed lines). The beam 1704 is a portion of a larger transmission pattern (not shown) that extends beyond the immediate vicinity of the antenna 1700. The beam 1704 is directed along a beam vector 1706, described by an angle "θ" relative to an axis 1708 normal to a surface of the antenna 1700. As described below, the beam 1704 is one or more of steerable or shapeable through control of operating parameters including, but not limited to, a phase and an amplitude of each antenna element 1702.

In FIG. 17, the antenna 1700 includes, within a transmitter section 1712, the antenna elements 1702, which may include, but are not limited to, omnidirectional transmitter antennas coupled to a transmitter system 1710, such as the downlink transmitter 1550 of FIG. 15. The transmitter system 1710 provides a signal, such as a downlink signal to be transmitted to a ground station on the surface. The downlink signal is provided to each antenna element 1702 as a time-varying signal that may include several multiplexed signals. To steer the beam 1704 relative to the axis 1708, the antenna 1700 (e.g., phased array antenna system) includes antenna control electronics 1714 controlling a radio frequency (RF) feeding network 1716, including multiple signal conditioning components 1718 interposed between the antenna elements 1702 and the transmitter system 1710. The signal conditioning components 1718 introduce one or more of a phase modulation or an amplitude modulation (e.g., by phase shifters), as denoted by "A" in FIG. 17, to the signal sent to the antenna elements 1702. As shown in FIG. 17, introducing a progressive phase modulation produces interference in the individual transmission of each antenna element 1702 that generates the beam 1704.

The phase modulation imposed on each antenna element 1702 can differ and can be dependent on a spatial location of a communication target that determines an optimum beam vector (e.g., where the beam vector 1706 is found by one or more of maximizing signal intensity or connection strength). The optimum beam vector may change with time as the communication target 1610 moves relative to the antenna 1700 (e.g., phased array antenna system).

In the above description, numerous details are set forth. It will be apparent, however, to one of ordinary skill in the art having the benefit of this disclosure, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A customer terminal (CT) comprising:
an array antenna;
a beamforming circuitry coupled to the array antenna;
a voltage-controlled oscillator (VCO) that generates a first differential signal having a first frequency;
a polyphase filter (PPF) coupled to the VCO, the PPF generates four phase signals using the first differential signal;
an edge combiner coupled to the PPF, the edge combiner generates eight phase signals using the four phase signals;
an in-phase path (I path) and a quadrature path (Q path) coupled to the edge combiner and the beamforming circuitry, wherein each of the I path and the Q path comprises:
a first mixer that multiplies a first pair of signals of the eight phase signals by a second pair of signals of the eight phase signals to generate a second differential signal;
a second mixer that multiplies a third pair of signals of the eight phase signals by a fourth pair of signals of the eight phase signals, respectively, to generate a third differential signal, wherein a sum of the second differential signal and the third differential signal is a fourth differential signal having a second frequency that is twice the first frequency;
a third mixer that selectively multiplies the fourth differential signal by the second pair of signals to generate a fifth differential signal having a third frequency that is three times the first frequency;
a variable inductor configured to have a first inductance in a first mode and a second inductance in a second mode; and
a variable capacitor configured to have a first capacitance in the first mode and a second capacitance in the second mode, wherein:
in the first mode, each of the I path and the Q path provides the fourth differential signal to the beamforming circuitry; and
in the second mode, each of the I path and the Q path provides the fifth differential signal to the beamforming circuitry.

2. The CT of claim 1, wherein:
the variable capacitor comprises a plurality of capacitive elements, each capacitive element coupled in series with a first switch; and
the variable inductor comprises:
a first inductor comprising a first inductive element and a second inductive element coupled in parallel to a direct current (DC) terminal;
a second switch coupled between the first inductive element and the second inductive element, wherein the second switch is activated in the second mode and shorts the first inductor to the DC terminal; and
a second inductor comprising a third inductive element coupled in series with the first inductive element and a fourth inductive element coupled in series with the second inductive element.

3. A customer terminal (CT) comprising:
a local oscillator (LO) that generates a first differential signal having a first frequency;
a LO distribution circuit coupled to the LO, the LO distribution circuit comprising:
a variable capacitance circuit configured to have a first capacitance in a first mode of the CT and a second capacitance in a second mode of the CT; and
a variable inductance circuit configured to have a first inductance in the first mode and a second inductance in the second mode; wherein the LO distribution circuit is configured to:
in the first mode, generate a second differential signal having a second frequency that is twice the first frequency; or
in the second mode, generate a third differential signal having a third frequency that is three times the first frequency.

4. The CT of claim 3, wherein the LO is a voltage-controlled oscillator (VCO), wherein the LO distribution circuit further comprises:
a polyphase filter (PPF) coupled to the LO, wherein the PPF is configured to generate four phase signals using the first differential signal;
an edge combiner coupled to the PPF, wherein the edge combiner is configured to generate eight phase signals using the four phase signals; and
a first set of mixers configured in an in-phase path (I path) and a second set of mixers configured in a quadrature path (Q path) coupled to the edge combiner.

5. The CT of claim 3, wherein the LO distribution circuit further comprises:
a first mixer configured to multiply a first pair of a plurality of phase signals of the first differential signal by a second pair of the plurality of phase signals to generate a fourth differential signal;
a second mixer configured to multiply a third pair of the plurality of phase signals by a fourth pair of the plurality of phase signals to generate a fifth differential signal, wherein a sum of the fourth differential signal and the fifth differential signal is the second differential signal; and
a third mixer configured to selectively multiply the second differential signal by the second pair of the plurality of phase signals to generate the third differential signal.

6. The CT of claim 3, further comprising:
a buffer circuit coupled to the LO and the LO distribution circuit;
a second LO distribution circuit coupled to the buffer circuit;
a first set of digital beamforming devices coupled to the LO distribution circuit; and
a second set of digital beamforming devices coupled to the second LO distribution circuit.

7. The CT of claim 6, wherein the first set of digital beamforming devices comprises:
a first digital beamforming device comprises a first mixer, wherein the first mixer is configured to multiply a first radio frequency (RF) signal with the second differential signal to obtain a first baseband signal; and a second digital beamforming device comprises a second mixer, wherein the second mixer is configured to multiply a second baseband signal with the third differential signal to obtain a second RF signal.

8. The CT of claim 6, wherein the first set of digital beamforming devices comprises:
a first digital beamforming device comprises a first mixer, wherein the first mixer is configured to multiply a first baseband signal with the second differential signal to obtain a first radio frequency (RF) signal; and
a second digital beamforming device comprising comprises a second mixer, wherein the second mixer is configured to multiply a second RF signal with the third differential signal to obtain a second baseband signal.

9. The CT of claim 3, further comprising:
a set of digital beamforming devices coupled to the LO distribution circuit, wherein the LO distribution circuit comprises:
an in-phase path (I path) comprising:
a first mixer configured to generate a fourth differential signal;
a second mixer configured to generate a fifth differential signal; and
a third mixer configured to generate the third differential signal; and
a quadrature path (Q path) comprising:
a fourth mixer configured to generate a sixth differential signal;
a fifth mixer configured to generate a seventh differential signal; and
a sixth mixer configured to generate a ninth differential signal that has the third frequency.

10. The CT of claim 9, wherein:
a sum of the fourth differential signal and the fifth differential signal is the second differential signal;
the variable capacitance circuit and the variable inductance circuit are coupled to the second mixer in the first mode and the third mixer in the second mode;
a sum of the sixth differential signal and the seventh differential signal is an eighth differential signal that has the second frequency; and
a second variable capacitance circuit and a second variable inductance circuit are coupled to the fifth mixer in the first mode and the sixth mixer in the second mode.

11. The CT of claim 10, wherein the I path further comprises a first buffer circuit coupled to the variable capacitance circuit and the variable inductance circuit, wherein the Q path further comprises a second buffer circuit coupled to the second variable capacitance circuit and the second variable inductance circuit.

12. The CT of claim 10, wherein the LO distribution circuit comprises an edge combiner, wherein the edge combiner is configured to:
receive four phase signals of the first differential signal; and
generate a first phase signal, a second phase signal, a third phase signal, a fourth phase signal, a fifth phase signal, a sixth phase signal, a seventh phase signal, and an eighth phase signal, wherein:
the first mixer is configured to multiply a first pair of signals, comprising the second phase signal and the sixth phase signal, by a second pair of signals, comprising the first phase signal and the fifth phase signal, to generate the fourth differential signal;
the second mixer is configured to multiply a third pair of signals, comprising the fourth phase signal and the eighth phase signal, by a fourth pair of signals, comprising the third phase signal and the seventh phase signal, to generate the fifth differential signal;
the fourth mixer is configured to multiply the fourth pair of signals by the first pair of signals to generate the seventh differential signal; and
the fifth mixer is configured to multiply the second pair of signals by the third pair of signals to generate the eighth differential signal.

13. The CT of claim 3, further comprising:
an array antenna;
a first digital beamforming device coupled to at least a first antenna element of the array antenna, the first digital beamforming device to operate in a first frequency range, wherein the second frequency is in the first frequency range; and
a second digital beamforming device coupled to at least a second antenna element of the array antenna, the second digital beamforming device to operate in a second frequency range higher than the first frequency range, wherein the third frequency is in the second frequency range, and wherein the LO distribution circuit is to provide the second differential signal having the second frequency to the first digital beamforming device and the third differential signal having the third frequency to the second digital beamforming device.

14. The CT of claim 3, wherein the LO distribution circuit is configured to switch between the first mode and the second mode in less than 10 microseconds.

15. A communication device comprising:
a local oscillator (LO) that generates a first differential signal having a first frequency;
a frequency multiplier circuit coupled to the LO, wherein the frequency multiplier circuit is configured to generate a second differential signal having a second frequency that is double the first frequency or a third differential signal having a third frequency that is triple the first frequency;
a first set of one or more digital beamforming devices configured to use the second differential signal to receive one or more radio frequency (RF) signals in a first frequency range;
a second set of one or more digital beamforming devices configured to use the third differential signal to send one or more RF signals in a second frequency range that is higher than the first frequency range, wherein the frequency multiplier circuit comprises:
a variable capacitance circuit that is programmable to one of a plurality of capacitances; and
a variable inductance circuit that is programmed to a first inductance for the second differential signal having the second frequency and to a second inductance for the third differential signal having the third frequency.

16. The communication device of claim 15, further comprising:
a first buffer circuit coupled to the LO and the frequency multiplier circuit;
a second frequency multiplier circuit coupled to the first buffer circuit, wherein the second frequency multiplier circuit is configured to generate a fourth differential signal having the second frequency or a fifth differential signal having the third frequency;
a third set of one or more digital beamforming devices configured to use the fourth differential signal to receive the one or more RF signals in the first frequency range;

a fourth set of one or more digital beamforming devices configured to use the fifth differential signal to send the one or more RF signals in the second frequency range, wherein the second frequency multiplier circuit comprises:
  a second variable capacitance circuit that is programmable to the one of the plurality of capacitances; and
  a second variable inductance circuit that is programmed to the first inductance for the fourth differential signal having the second frequency and to the second inductance for the fifth differential signal having the third frequency.

17. The communication device of claim 16, further comprising:
  a second buffer circuit coupled between the frequency multiplier circuit and the first set of one or more digital beamforming devices and the second set of digital beamforming devices; and
  a third buffer circuit coupled between the second frequency multiplier circuit and the third set of one or more digital beamforming devices and the fourth set of one or more digital beamforming devices.

18. The communication device of claim 15, further comprising a signal generator coupled to the LO and the frequency multiplier circuit, wherein the signal generator is configured to generate eight phase signals using the first differential signal, wherein the frequency multiplier circuit uses the eight phase signals to generate the second differential signal or the third differential signal.

19. The communication device of claim 18, wherein the signal generator comprises:
  a polyphase filter to generate four quadrature phase signals; and
  an edge combiner coupled to the polyphase filter, wherein the edge combiner is configured to generate the eight phase signals using the four quadrature phase signals.

20. The communication device of claim 15, wherein the frequency multiplier circuit comprises:
  a first mixer configured to multiply a first pair of a plurality of phase signals of the first differential signal by a second pair of the plurality of phase signals to generate a fourth differential signal;
  a second mixer configured to multiply a third pair of the plurality of phase signals by a fourth pair of the plurality of phase signals to generate a fifth differential signal, wherein a sum of the fourth differential signal and the fifth differential signal is the second differential signal; and
  a third mixer configured to selectively multiply the second differential signal by the second pair of the plurality of phase signals to generate the third differential signal.

* * * * *